(12) United States Patent
Tokura et al.

(10) Patent No.: US 8,307,938 B2
(45) Date of Patent: Nov. 13, 2012

(54) ELECTRIC POWER STEERING APPARATUS

(75) Inventors: Shinichi Tokura, Tochigi (JP);
Kazumasa Hayashi, Tochigi (JP);
Tatsuru Niihara, Tochigi (JP)

(73) Assignee: Showa Corporation, Saitama (JP)

( * ) Notice: Subject to any disclaimer, the term of this patent is extended or adjusted under 35 U.S.C. 154(b) by 452 days.

(21) Appl. No.: 12/562,417

(22) Filed: Sep. 18, 2009

(65) Prior Publication Data

US 2010/0181139 A1 Jul. 22, 2010

(30) Foreign Application Priority Data

| Jan. 22, 2009 | (JP) | 2009-012171 |
| Jan. 22, 2009 | (JP) | 2009-012189 |
| Mar. 27, 2009 | (JP) | 2009-080261 |

(51) Int. Cl.
*B62D 5/04* (2006.01)

(52) U.S. Cl. ...... 180/443; 180/412; 74/388 PS

(58) Field of Classification Search ...... 180/443, 180/444, 412; 74/409, 425, 388 PS; 384/490, 384/537

See application file for complete search history.

(56) References Cited

U.S. PATENT DOCUMENTS

| 871,227 | A * | 11/1907 | Ljungstrom | 74/411 |
| 2,586,293 | A * | 2/1952 | Birkigt | 74/425 |
| 6,044,723 | A * | 4/2000 | Eda et al. | 74/388 PS |
| 6,520,042 | B2 * | 2/2003 | Jammer et al. | 74/425 |
| 2002/0148315 | A1 * | 10/2002 | Mittendorf et al. | 74/425 |
| 2003/0026510 | A1 * | 2/2003 | Ishiwada et al. | 384/490 |
| 2006/0191736 | A1 * | 8/2006 | Maeda et al. | 180/444 |
| 2006/0191738 | A1 * | 8/2006 | Eda et al. | 180/444 |
| 2007/0102228 | A1 * | 5/2007 | Shiina et al. | 180/444 |
| 2007/0193819 | A1 * | 8/2007 | Iwasa et al. | 180/444 |
| 2007/0251757 | A1 * | 11/2007 | Segawa et al. | 180/444 |

FOREIGN PATENT DOCUMENTS

| JP | 2001-10512 | 1/2001 |
| JP | 2006-151043 | 6/2006 |

* cited by examiner

*Primary Examiner* — Lesley D Morris
*Assistant Examiner* — Maurice Williams
(74) *Attorney, Agent, or Firm* — Babcock IP, PLLC

(57) ABSTRACT

In an electric power steering apparatus, a worm gear is structured such that a leading end of a leading end shaft of the worm gear is always pressed and supported by a part in a peripheral direction of a diameter enlarged inner diameter portion of a collar which is urged by an elastically urging body, and is always urged toward a side coming close to a center shaft of a worm wheel.

9 Claims, 14 Drawing Sheets

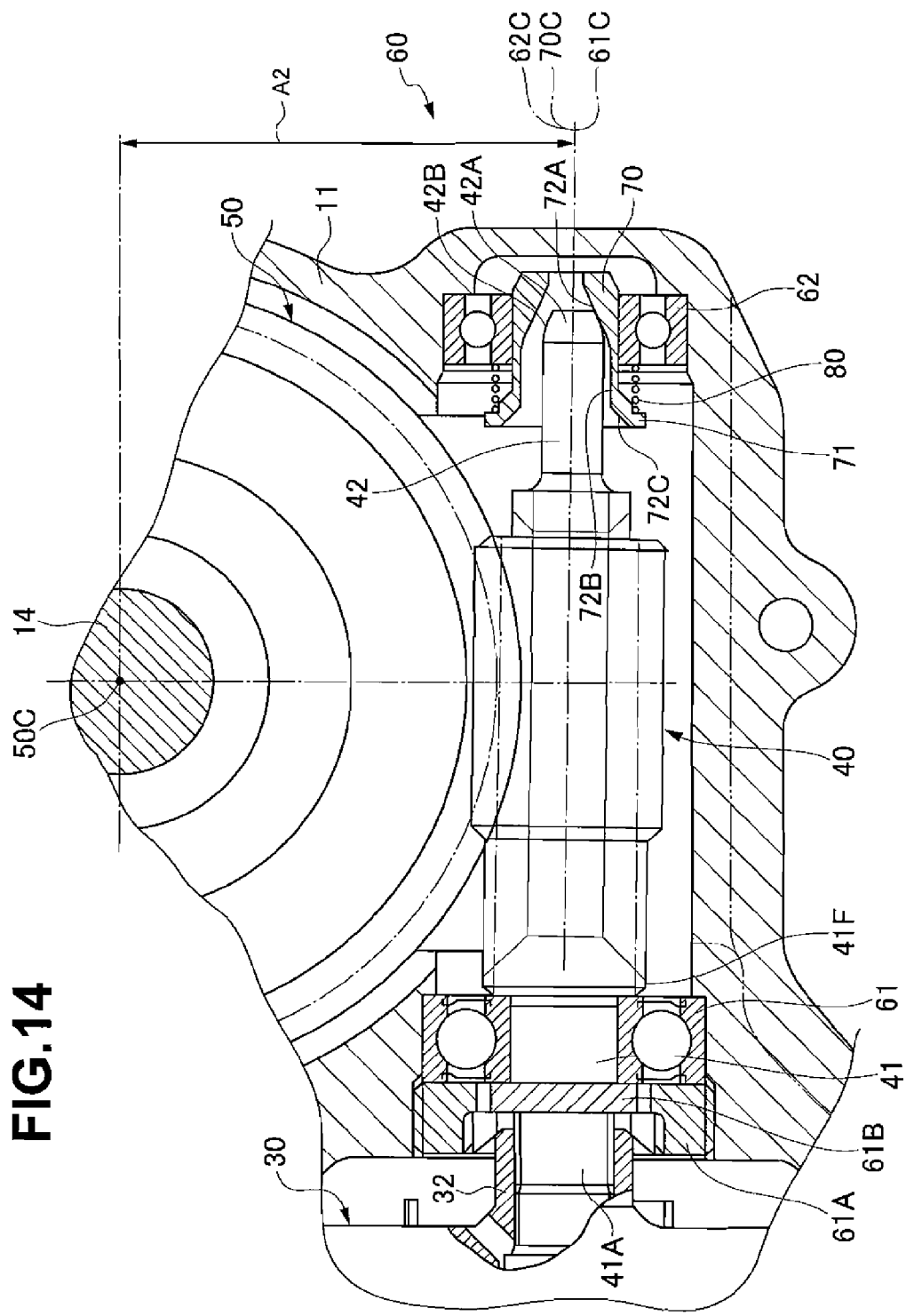

ELECTRIC POWER STEERING APPARATUS

BACKGROUND OF THE INVENTION

1. Field of the Invention

The present invention relates to an electric power steering apparatus.

2. Description of the Related Art

In an electric power steering apparatus, a pinion shaft coupled to a steering shaft via a torsion bar is rotatably mounted in a gear housing. A rack shaft engaging with the pinion shaft is supported in the gear housing linearly movable. A worm gear coupled to a drive shaft of an electric motor is rotatably mounted to the gear housing. A worm wheel fixed to an intermediate portion of the pinion shaft and engaging with the worm gear is rotatably mounted to the gear housing. The electric motor is dimensioned to apply a steering assist torque corresponding to a steering torque applied by a driver to the steering shaft to the rack shaft via an engagement between the worm gear and the worm wheel, and an engagement between the pinion shaft and the rack shaft.

In the electric power steering apparatus mentioned above, it is necessary to easily set a center distance between the worm gear and the worm wheel without being affected by a dimensional error of a part such as the worm gear or the like, at a time of assembling, and easily regulate the center distance at a time when the engagement between the worm gear and the worm wheel deteriorates with age after the assembly, thereby removing a backlash.

Further, in the electric power steering apparatus mentioned above, it is demanded to easily set the center distance between the worm gear and the worm wheel without being affected by the dimensional error of the parts such as the worm gear or the like at a time of assembling, and generate no abnormal noise at a time of the engagement between the worm gear and the worm wheel, after the assembly.

In an electric power steering apparatus described in Japanese Unexamined Patent Publication (JP-A) No. 2001-10512 (patent document 1), a ring body and a bearing case are interposed between an outer periphery of a bearing supporting a leading end shaft of a worm gear and a gear housing, and an inner periphery of a bearing case and an outer periphery of the ring body are brought into contact with each other via an inclined surface. Further, a disc spring and an adjusting screw are provided in an outer side in an axial direction with respect to the worm gear, and the disc spring pressed by the adjusting spring is brought into contact with one end surface of an outer ring of a bearing that is integrally formed with the ring body. The worm gear is biased toward the worm wheel so as to regulate the center distance therebetween by pressing the bearing and the ring body in the axial direction by a spring force of the disc spring and moving the bearing along the inclined surface of the bearing case, at a time of assembling the electric power steering apparatus or after the assembly, and thus the backlash thereof is eliminated.

The following problems exist in the electric power steering apparatus described in the patent document 1.

(1) As the backlash regulating means, the ring body and the bearing case are provided in the outer peripheral side of the bearing of the worm gear, and the disc spring and the adjusting screw are provided in the outer side in the axial direction of the bearing of the worm gear. Accordingly, the outer sides are enlarged in both directions including a diametrical direction and an axial direction around the bearing of the worm gear, and the electric power steering apparatus is enlarged in size.

(2) Since the disc spring is provided in the outer side in the axial direction of the bearing of the worm gear, an installing space of the disc spring becomes small in the case that it is intended to suppress an enlargement in size of the electric power steering apparatus, and a flexibility for designing the disc spring is reduced.

(3) Since the adjusting screw pressurizing the disc spring engages with the gear housing, and includes the screw portion, the electric power steering apparatus cannot be easily assembled.

Further, the following problems exist in the electric power steering apparatus described in the patent document 1.

(4) As the backlash regulating means, the ring body and the bearing case are provided in the outer peripheral side of the bearing of the worm gear, and the disc spring and the adjusting screw are provided in the outer side in the axial direction of the bearing of the worm gear. Accordingly, even if it is possible to eliminate the abnormal noise at a time when both the elements are engaged, by eliminating the backlash between the worm gear and the worm wheel, an engaging friction (a frictional resistance caused by the engagement) between both the elements becomes large.

(5) An outer size around the bearing of the worm gear becomes large in both the diametrical direction and the axial direction, and the electric power steering apparatus becomes large in size.

SUMMARY OF THE INVENTION

An object of the present invention is to improve a downsizing, a flexibility for designing and an assembling property of an electric power steering apparatus, while making it possible to eliminate a backlash between a worm gear and a worm wheel, in the electric power steering apparatus.

An object of the present invention is to prevent an abnormal noise while preventing an increase of a friction caused by an engagement between the worm gear and the worm wheel, in the electric power steering apparatus and improve a downsizing, a flexibility for designing and an assembling property of the electric power steering apparatus.

In the invention claimed in claim 1, there is provided an electric power steering apparatus in which a worm gear coupled to a drive shaft of an electric motor is rotatably mounted in a gear housing, and a worm wheel fixed to an intermediate portion of a steering shaft and engaged with the worm gear is rotatably mounted in the gear housing. A base end shaft close to the electric motor in the worm gear is supported by a reference bearing fixed to the gear housing. A leading end shaft of the worm gear in an opposite side to the electric motor is supported by a leading end bearing fixed to the gear housing via a collar. The collar is inserted in the leading end bearing slidable in an axial direction, and an elastically urging body urging the collar toward the worm gear is interposed between a flange portion provided in a side protruding from the leading end bearing toward the worm gear and an end surface of the leading end bearing. The collar is provided with a diameter enlarged inner diameter portion which is diameter enlarged toward the worm gear, and is dimensioned to support a leading end of a leading end shaft of the worm gear to the diameter enlarged inner diameter portion of the collar. The worm gear is supported by always pressing the leading end of the leading end shaft of the worm gear by a part in a peripheral direction of the diameter enlarged inner diameter portion of the collar urged by the elastically urging body, and is always urged toward a side coming close to a center shaft of the worm wheel.

In accordance with the present invention, the following effects can be obtained.

(a) The worm gear is supported by always pressing the leading end of the leading end shaft of the worm gear by a part in the peripheral direction of the diameter enlarged inner diameter portion of the collar urged by the elastically urging body, and is always urged toward the side coming close to the center shaft of the worm wheel. Accordingly, the center distance between the worm gear and the worm wheel is regulated in such a manner as to always automatically eliminate the backlash between both the elements during or after the assembly, and is regulated in such a manner as to always set the backlash caused by the dimensional error in an assembling stage, or the deterioration with age of the engagement state due to the abrasion after the assembly or the like become always zero.

(b) The collar and the elastically urging body included in the backlash regulating means are provided in the inner side of the leading end bearing in both the diametrical direction and the axial direction of the leading end bearing for the leading end shaft of the worm gear. Accordingly, the outer size of the electric power steering apparatus does not become large in both the diametrical direction and the axial direction around the leading end bearing for the worm gear, and it is possible to downsize the electric power steering apparatus.

(c) The elastically urging body urging the collar toward the worm gear is interposed between the flange portion provided in the collar at a side protruding from the leading end bearing toward the worm gear, and the end surface of the leading end bearing. Accordingly, the elastically urging body is provided in the inner side in the axial direction of the leading end bearing for the worm gear, it is possible to install the elastically urging body in a wide area of a free space around the protruding portion from the leading end bearing of the collar while downsizing the electric power steering apparatus, and a flexibility for designing the elastically urging body is increased.

(d) Since the constructing parts of the backlash regulating means are constituted by the collar and the elastically urging body, and do not accompany any screw portion, it is possible to improve an assembling property of the electric power steering apparatus.

In the invention claimed in claim 2, there is provided the electric power steering apparatus according to claim 1, wherein the reference bearing oscillatorily supports the center shaft of the worm gear.

In accordance with the present invention, the following effect can be obtained.

(e) The reference bearing supporting the base end shaft of the worm gear oscillatorily supports the center shaft of the worm. Accordingly, it is possible to oscillate the worm gear with respect to the reference bearing so as to bias toward the worm wheel, by the pressurizing force which is generated by the diameter enlarged inner diameter portion of the collar pressuring the worm gear toward the worm wheel.

The present invention claimed in claim 3, there is provided the electric power steering apparatus according to claim 1, wherein the leading end of the leading end shaft of the worm gear is provided with a R-shaped or taper-shaped chamfer portion supported by the diameter enlarged inner diameter portion of the collar.

In accordance with the present invention, the following effect can be obtained.

(f) The leading end of the leading end shaft of the worm gear is provided with the R-shaped or taper-shaped chamfer portion supported by the diameter enlarged inner diameter portion of the collar. Accordingly, it is possible to stably support the leading end of the leading end shaft of the worm gear by the diameter enlarged inner diameter portion of the collar.

The present invention claimed in claim 4, there is provided the electric power steering apparatus according to claim 1, wherein the leading end of the leading end shaft of the worm gear is supported by the diameter enlarged inner diameter portion of the collar via a grease.

In accordance with the present invention, the following effect can be obtained.

(g) The leading end of the leading end shaft of the worm gear is supported by the diameter enlarged inner diameter portion of the collar via the grease. Accordingly, it is possible to reduce the sliding friction supporting the leading end of the leading end shaft of the worm gear by the diameter enlarged inner diameter portion of the collar so as to stably support.

The present invention claimed in claim 5, there is provided the electric power steering apparatus according to claim 1, wherein the leading end bearing is biased toward the worm wheel with respect to the center of support of the reference bearing.

In accordance with the present invention, the following effect can be obtained.

(h) Since the leading end bearing to which the collar is inserted is biased toward the worm wheel with respect to the support center of the reference bearing, the leading end of the leading end shaft of the worm gear is supported by the inner diameter portion in the opposite side to the worm wheel in the diameter enlarged inner diameter portion of the collar. At this time, the collar is urged toward the worm gear by the elastically urging body, and the inner diameter portion supporting the leading end of the leading end shaft of the worm gear in the diameter enlarged inner diameter portion of the collar always pressures the worm gear toward the worm wheel on the basis of the contact angle with the collar, and can urge toward the worm wheel. Accordingly, the center distance between the worm gear and the worm wheel can be regulated in such a manner as to always automatically eliminate the backlash between both the elements during or after the assembly, and it is possible to regulate in such a manner that the backlash caused by the dimensional error in the assembling stage thereof or the deterioration with age of the engagement state due to the abrasion after the assembly or the like becomes always zero.

The present invention claimed in claim 6, there is provided an electric power steering apparatus having a worm gear coupled to a drive shaft of an electric motor and pivotally supported in a gear housing, and having a worm wheel fixed to an intermediate portion of a steering shaft engaged with the worm gear is rotatably mounted in the gear housing. A base end shaft close to the electric motor in the worm gear is supported by a reference bearing fixed to the gear housing. A collar is inserted in a leading end bearing fixed to the gear housing slidable in an axial direction. A leading end of a leading end shaft in an opposite side to the electric motor in the worm gear is loosely inserted in an inner diameter portion of the collar. The collar is provided with an elastically urging body interposed between the collar and a root portion of the leading end shaft of the worm gear. The worm gear is always urged toward a side coming close to a center shaft of the worm wheel by an urging force of the elastically urging body interposed between the worm gear and the collar.

In accordance with the present invention, the following effects can be obtained.

(i) The collar is provided with the elastically urging body which is interposed between the collar and the root portion of the leading end shaft of the worm gear, and the worm gear is always urged toward the side coming close to the center shaft of the worm wheel by the urging force of the elastically urging body interposed between the worm gear and the collar. Accordingly, the center distance between the worm gear and the worm wheel is regulated in such a manner as to always automatically eliminate the backlash between both the elements whichever at the assembling time or after the assembly, and it is possible to regulate in such a manner that the backlash, caused by the dimensional error in the assembling stage or the deterioration with age of the engaging state due to the abrasion or the like after the assembly, always becomes zero.

(j) The collar and the elastically urging body included in the backlash regulating means are provided in the inner side of the leading end bearing in both the diametrical direction and the axial direction of the leading end bearing for the leading end shaft of the worm gear. Accordingly, the outer size of the electric power steering apparatus does not become large in both the diametrical direction and the axial direction around the leading end bearing 62 for the worm gear, and it is possible to achieve the downsizing of the electric power steering apparatus.

(k) The elastically urging body is interposed between the collar and the root portion of the leading end shaft of the worm gear. Accordingly, the elastically urging body is provided in the inner side in the axial direction of the leading end bearing for the worm gear, it is possible to install the elastically urging body in a wide area of a free space between the collar and the root portion of the leading end shaft of the worm gear while downsizing of the electric power steering apparatus, and a flexibility for designing the elastically urging body is increased.

(l) The constructing parts of the backlash regulating means are constituted by the collar and the elastically urging body, and which does not accompany any screw portion, it is possible to improve an assembling property of the electric power steering apparatus.

The present invention claimed in claim 7, there is provided the electric power steering apparatus according to claim 6, wherein the leading end bearing and the collar are biased toward the worm wheel with respect to the center of support of the reference bearing, and the elastically urging body urges the leading end shaft of the worm gear so as to align with the center shaft of the collar.

In accordance with the present invention, the following effect can be obtained.

(m) The leading end bearing and the collar are biased toward the worm wheel with respect to the center of support of the reference bearing, and the elastically urging body urges the leading end shaft of the worm gear into alignment with the center shaft of the collar. Accordingly, the worm gear is always securely urged toward the side coming close to the center shaft of the worm wheel by the urging force of the elastically urging body interposed between the worm gear and the collar.

The present invention claimed in claim 8, there is provided the electric power steering apparatus according to claim 7, wherein the elastically urging body is a coil spring, and each of both ends of the coil spring is attached to each of the collar and a root portion of the leading end shaft of the worm gear.

In accordance with the present invention, the following effect can be obtained.

(n) The elastically urging body is the coil spring, and each of both the ends of the coil spring is attached to each of the collar and the root portion of the leading end shaft of the worm gear. Accordingly, it is possible to easily align the leading end shaft of the worm gear with the center shaft of the collar by the elastically urging body, which is the coil spring.

The present invention claimed in claim 9, there is provided the electric power steering apparatus according to claim 8, wherein the elastically urging body supports in a floating manner the leading end of the leading end shaft of the worm gear with respect to an inner diameter portion of the collar.

In accordance with the present invention, the following effect can be obtained.

(o) The elastically urging body, which is the coil spring, supports in a floating manner the leading end of the leading end shaft of the worm gear with respect to the inner diameter portion of the collar. Accordingly, the worm gear is always urged toward the side coming close to the center shaft of the worm wheel in a state of being supported in a floating manner by the elastically urging body, and it is possible to always automatically eliminate the backlash between both the elements without increasing any friction between the worm gear and the worm wheel.

In a further embodiment, there is provided the electric power steering apparatus, wherein an elastic body is attached to a leading end outer periphery of the leading end shaft of the worm gear.

In accordance with the present invention, the following effect can be obtained.

(p) Even if the leading end of the leading end shaft of the worm gear which is supported in a floating manner by the elastically urging body of the coil spring comes into collision with the inner diameter portion of the collar due to its floating, the shock due to the collision is absorbed by the elastically urging body in the leading end outer periphery of the leading end shaft, and the slapping sound is prevented.

In another embodiment, there is provided the electric power steering apparatus, wherein the collar is provided with a diameter enlarged inner diameter portion which is diameter enlarged toward the worm gear, and the leading end of the leading end shaft of the worm gear is dimensioned to be supported by the diameter enlarged inner diameter portion of the collar.

In accordance with the present invention, the following effect can be obtained.

(q) The collar is provided with the diameter enlarged inner diameter portion which is diameter enlarged toward the worm gear, and is dimensioned to support the leading end of the leading end shaft of the worm gear to the diameter enlarged inner diameter portion of the collar. The leading end of the leading end shaft of the worm gear which is supported in the floating manner by the elastically urging body of the coil spring is supported struck against the diameter enlarged inner diameter portion of the collar, and the leading end of the leading end shaft of the worm gear is supported in a floating manner without any backlash with respect to the inner diameter portion of the collar. Accordingly, it is possible to prevent the collision with the inner diameter portion of the collar under floating from being generated, while supporting the worm gear in a floating manner by the elastically urging body, and it is possible to avoid the slapping sound.

In another embodiment there is provided the electric power steering apparatus, wherein the reference bearing oscillatorily supports the center shaft of the worm.

In accordance with the present invention, the following effect can be obtained.

(r) The reference bearing supporting the base end shaft of the worm gear oscillatorily supports the center shaft of the worm gear. Accordingly, it is possible to oscillate the worm gear with respect to the reference bearing by the urging force of the elastically urging body with respect to the collar, thereby displacing to the side coming close to the center shaft of the worm wheel, and it is possible to eliminate the backlash between the worm gear and the worm wheel.

In another embodiment, there is provided an electric power steering apparatus having a worm gear coupled to a drive shaft of an electric motor and rotatably mounted in a gear housing, and having a worm wheel fixed to an intermediate portion of a steering shaft engaged with the worm gear is rotatably mounted in the gear housing. A base end shaft close to the electric motor in the worm gear is supported by a reference bearing fixed to the gear housing. A leading end shaft in an opposite side to the electric motor in the worm gear is supported by a leading end bearing fixed to the gear housing via a collar. The collar is inserted in the leading end bearing slidable in an axial direction, and an elastically urging body urging the collar toward the worm gear is interposed between a flange portion provided in a side protruding from the leading end bearing toward the worm gear and an end surface of the leading end bearing. The collar is provided with a diameter enlarged inner diameter portion which is diameter enlarged toward the worm gear, and is dimensioned to support a leading end of a leading end shaft of the worm gear to the diameter enlarged inner diameter portion of the collar. A center shaft of the worm gear is set at a neutral position which is coaxial with a center shaft of the collar, by making a whole periphery of the leading end of the leading end shaft of the worm gear seat on a whole periphery of the diameter enlarged inner diameter portion of the collar, at a time when the motor does not rotate. The leading end of the leading end shaft of the worm gear which is away from the center shaft of the worm wheel by a rotational contact pressure between a tooth surface of the worm gear and a tooth surface of the worm wheel is supported by a part in a peripheral direction of the diameter enlarged inner diameter portion of the collar which is urged by the elastically urging body, at a time when the motor rotates.

In accordance with the present invention, the following effects can be obtained.

(s) The leading end of the leading end shaft of the worm gear is supported by the diameter enlarged inner diameter portion of the collar. At this time, the collar is urged in the axial direction heading for the worm gear by the elastically urging body.

When the motor (the worm gear) is not rotated, a whole periphery of the leading end of the leading end shaft of the worm gear is seated on a whole periphery of the diameter enlarged inner diameter portion of the collar, and a center shaft of the worm gear is set at a neutral position which is coaxial with the center shaft of the collar. At this time, the center shafts of the worm gear and the collar are coaxial, and a suitable backlash (a zero backlash or a fixed backlash) is set between the worm gear and the worm wheel (FIG. 15A). Further, the collar is urged toward the worm gear by the elastically urging body, and a center distance between the worm gear and the worm wheel is A1 (FIGS. 11 and 12).

On the other hand, when the motor (the worm gear) is rotated, it is possible to support the leading end of the leading end shaft of the worm gear which is away from the center shaft of the worm wheel by a rotational contact pressure between a tooth surface of the worm gear and a tooth surface of the worm wheel by a part in a peripheral direction of the diameter enlarged inner diameter portion of the collar which is urged by the elastically urging body. At this time, the leading end of the leading end shaft of the worm gear is actuated in such a manner as to press the collar to the bearing against the urging force of the elastically urging body, and the worm gear is biased toward an opposite to the worm wheel (FIG. 15B). Accordingly, it is possible to soften the collision between the tooth surfaces by increasing a center distance A2 (letting the worm gear out of the worm wheel) (in which the backlash is increased), at a time when the worm gear and the worm wheel are engaged by the rotation of the motor, and it is possible to reduce the abnormal noise generated by the collision between both the elements. Further, it is possible to prevent the friction from being increased at a time when both the elements are engaged, by increasing the center distance between the worm gear and the worm wheel (FIGS. 12 and 13).

(t) The collar and the elastically urging body constructing the friction and abnormal noise preventing means are provided in the inner side of the bearing in both the diametrical direction and the axial direction of the bearing for the leading end shaft of the worm gear. Accordingly, the outer size of the electric power steering apparatus does not become large in both the diametrical direction and the axial direction around the eccentric bearing for the worm gear, and it is possible to downsize the electric power steering apparatus.

(u) The elastically urging body urging the collar toward the worm gear is interposed between the flange portion provided in the side protruding from the leading end bearing of the collar toward the worm gear, and the end surface of the leading end bearing. Accordingly, the elastically urging body is provided in the inner side in the axial direction of the leading end bearing for the worm gear, it is possible to install the elastically urging body in a wide area of a free space around the protruding portion from the leading end bearing of the collar while intending to downsize the electric power steering apparatus, and a flexibility for designing the elastically urging body is increased.

(v) Since the constructing parts of the friction and abnormal noise preventing means are constituted by the collar and the elastically urging body, and do not accompany any screw portion, it is possible to improve an assembling property of the electric power steering apparatus.

In another embodiment, there is provided the electric power steering apparatus, wherein the reference bearing oscillatorily supports the center shaft of the worm gear.

In accordance with the present invention, the following effect can be obtained.

(w) The reference bearing supporting the base end shaft of the worm gear oscillatorily supports the center shaft of the worm gear. Accordingly, it is possible to oscillate the worm gear with respect to the reference bearing so as to bias to the opposite side to the worm wheel.

In another embodiment, there is provided the electric power steering apparatus, wherein the leading end of the leading end shaft of the worm gear is provided with a R-shaped or taper-shaped chamfer portion supported by the diameter enlarged inner diameter portion of the collar.

In accordance with the present invention, the following effect can be obtained.

(x) The leading end of the leading end shaft of the worm gear is provided with the R-shaped or taper-shaped chamfer portion supported by the diameter enlarged inner diameter portion of the collar. Accordingly, it is possible to stably support the leading end of the leading end shaft of the worm gear by the diameter enlarged inner diameter portion of the collar.

In another embodiment, there is provided the electric power steering apparatus, wherein the leading end of the leading end shaft of the worm gear is supported by the diameter enlarged inner diameter portion of the collar via a grease.

In accordance with the present invention, the following effect can be obtained.

(y) The leading end of the leading end shaft of the worm gear is supported by the diameter enlarged inner diameter portion of the collar via the grease. Accordingly, it is possible to reduce the sliding friction supporting the leading end of the leading end shaft of the worm gear by the diameter enlarged inner diameter portion of the collar so as to stably support.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIG. 14 is an enlarged cross sectional view of a substantial part in FIG. 13; and FIGS. 15A and 15B show a support state of the worm gear by the collar, in which FIG. 15A is a cross sectional view showing a neutral state, and FIG. 15B is a cross sectional view showing a biased state.

DESCRIPTION OF THE PREFERRED EMBODIMENTS

Figure 1:
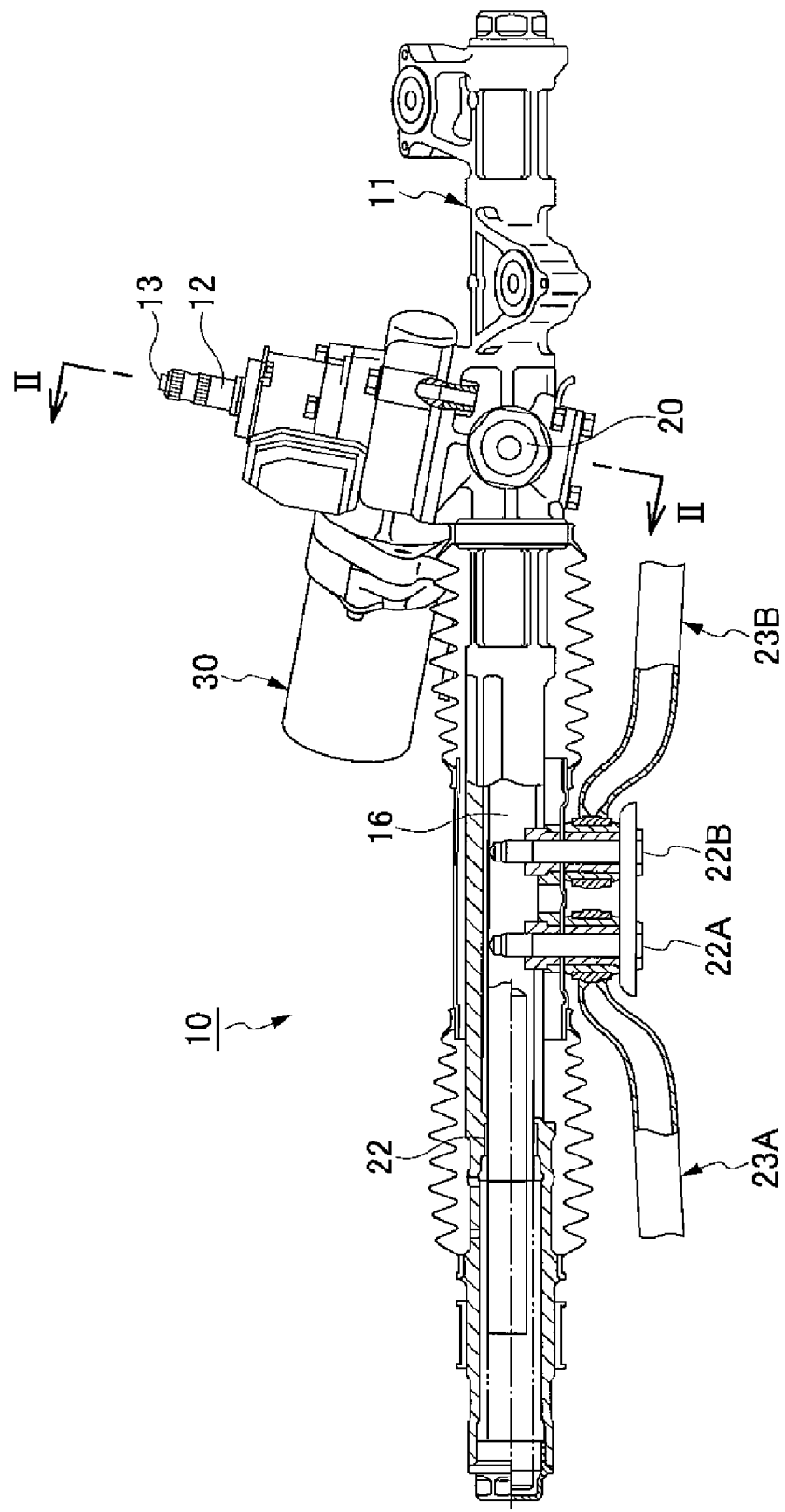
FIG. 1 is a front elevational view showing an electric power steering apparatus by partly rupturing.
Figure 2:
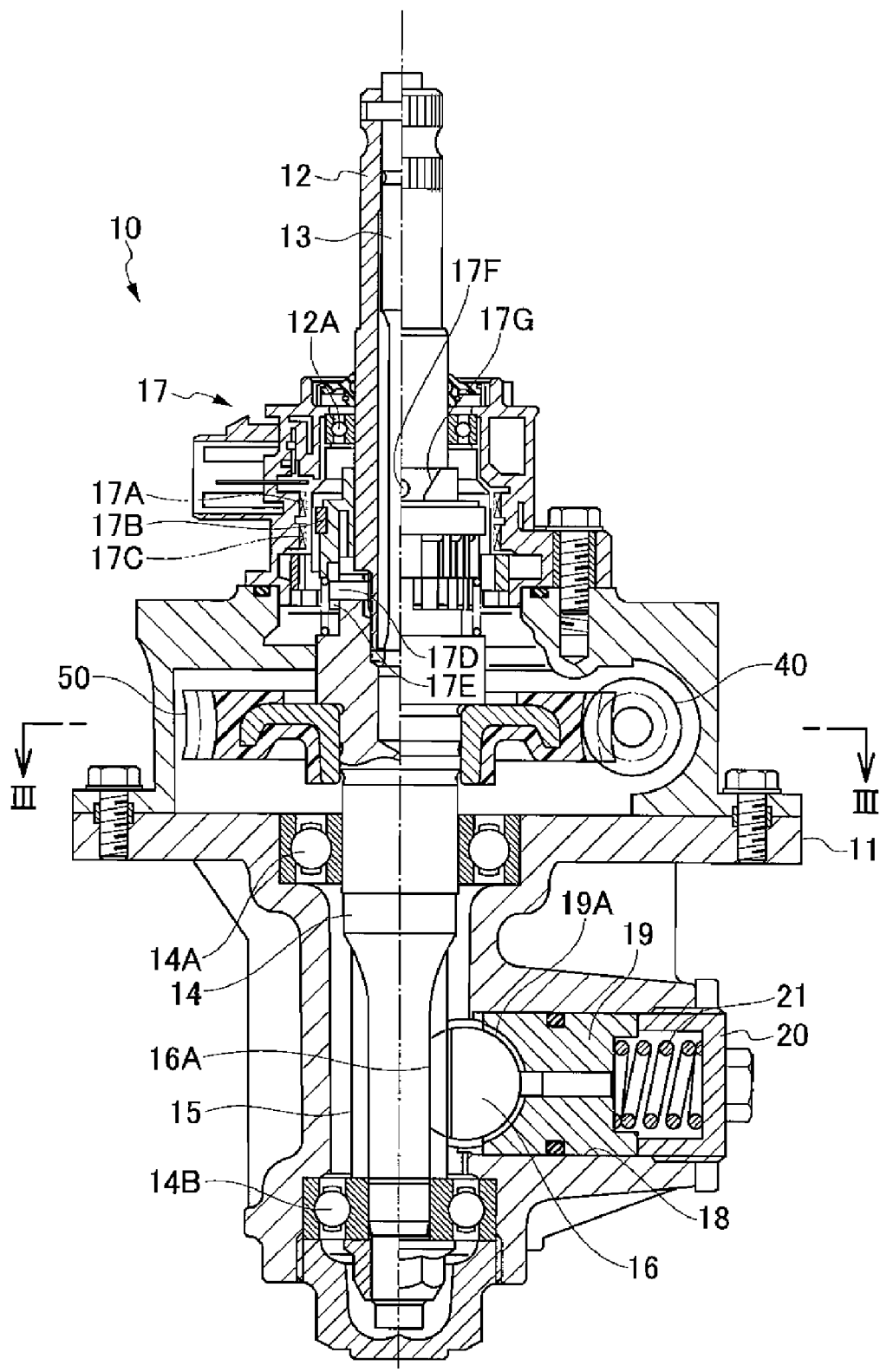
FIG. 2 is a cross sectional view along a line II-II in FIG. 1.

An electric power steering apparatus 10 has a gear housing 11 fixed to a vehicle body frame or the like by a bracket (not shown), as shown in FIGS. 1 and 2. A pinion shaft 14 is coaxially coupled to a steering shaft 12 to which a steering wheel is connected, via a torsion bar 13, a pinion 15 is provided on the pinion shaft 14, and a rack shaft 16 having a rack 16A engaging with the pinion 15 is supported in the gear housing 11 in such a manner that the rack shaft 16 is movable linearly right and left. A steering torque detecting apparatus 17 is provided between the steering shaft 12 and the pinion shaft 14. In this case, the steering shaft 12 and the pinion shaft 14 are supported in the gear housing 11 via bearings 12A, 14A and 14B.

The steering torque detecting apparatus 17 is provided with two detecting coils 17A and 17B, which surround a cylindrical core 17C engaging with the steering shaft 12 and the pinion shaft 14, and which are in the gear housing 11, as shown in FIG. 2. The core 17C is provided with a vertical groove 17E engaging with a guide pin 17D of the pinion shaft 14 movable only in an axial direction, and is provided with a spiral groove 17G engaging with a slider pin 17F of the steering shaft 12. Accordingly, when a driver applies a steering torque to the steering wheel, the steering torque is applied to the steering shaft 12, and the torsion bar 13 is elastically torsionally deformed. The steering shaft 12 and the pinion shaft 14 are relatively displaced in a rotating direction by the elastic torsional deformation of the torsion bar 13, and thus the core 17C displaces in an axial direction. The displacement of the core 17C causes a magnetic change around the detecting coils 17A and 17B, so that an inductance of the detecting coils 17A and 17B is changed. In other words, when the core 17C moves toward the steering shaft 12, the inductance of the detecting coil 17A, to which the core 17C moves close, is increased and the inductance of the detecting coil 17B, from which the core 17C moves away, is reduced. Accordingly, it is possible to detect the steering toque due to the change of the inductance.

A rack guide 19 is incorporated, as shown in FIG. 2, in a cylinder portion 18 provided at a portion which is opposed to the pinion 15 across one end of the rack shaft 16 within the gear housing 11. The rack guide 19 (a bush 19A) is elastically urged toward the rack shaft 16 by a spring 21, the back of which is supported by a cap 20 attached to cover the cylinder portion 18, then the rack guide 19 presses the rack 16A of the rack shaft 16 toward the pinion 15 while slidably supporting one end of the rack shaft 16. In this case, the other end of the rack shaft 16 is supported by a bearing 22. Left and right tie rods 23A and 23B are coupled to an intermediate portion of the rack shaft 16 by coupling bolts 22A and 22B, respectively.

Figure 3:
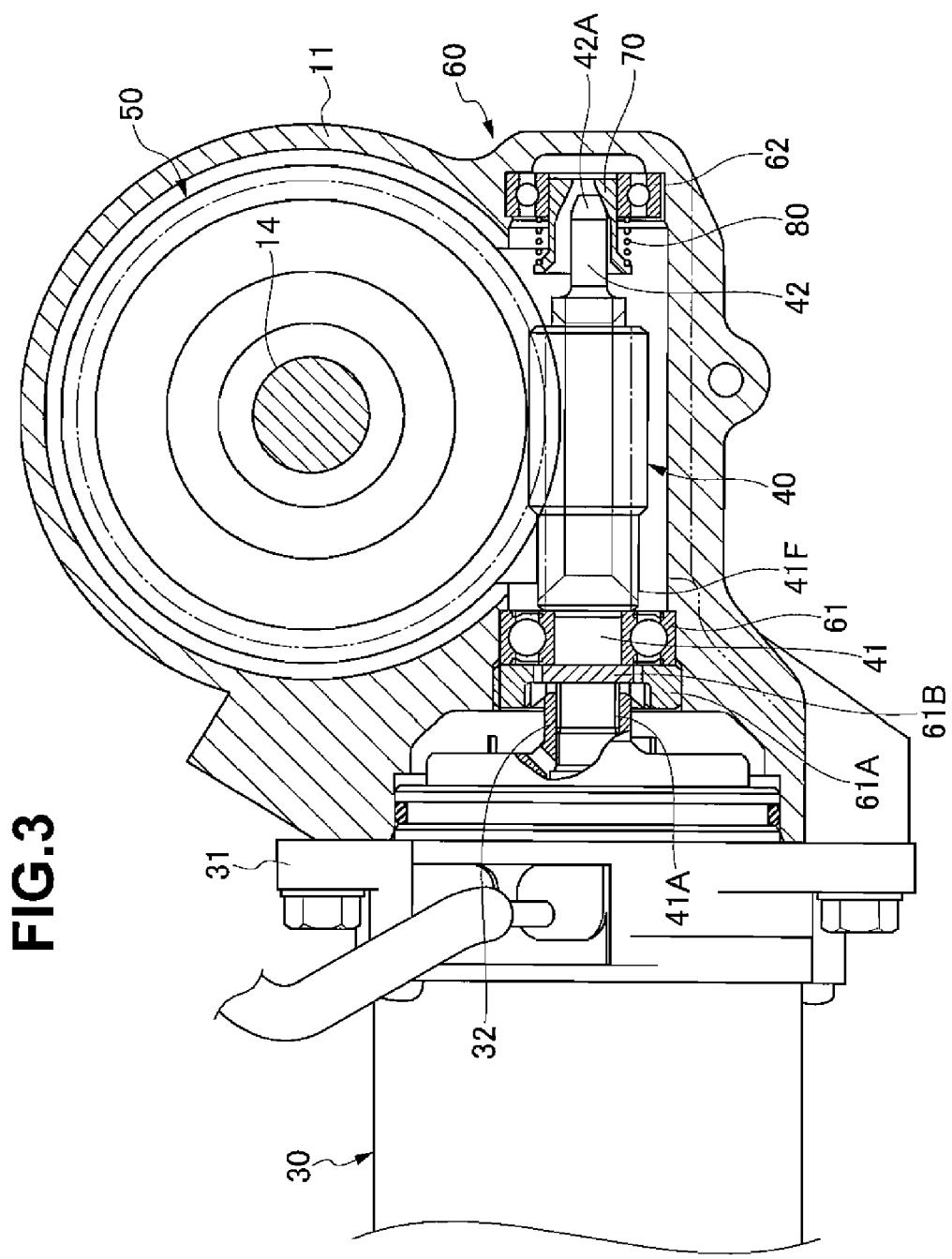
FIG. 3 is a cross sectional view along a line III-III in FIG. 2 in an embodiment 1.

A motor case 31 of an electric motor 30 is attached to the gear housing 11 as shown in FIG. 3. A worm gear 40 is spline coupled to a drive shaft 32 of the electric motor 30, and both ends of the worm gear 40 are supported in the gear housing 11 by bearings 61 and 62 mentioned below. The worm gear 40 is engaged with a worm wheel 50, and the worm wheel 50 is fixed to an intermediate portion of the pinion shaft 14 (a steering shaft). The electric motor 30 is driven by a steering torque detected by the steering torque detecting apparatus 17. The generated torque by the electric motor 30 is applied to the rack shaft 16 as a steering assist torque via an engagement between the worm gear 40 and the worm wheel 50, and an engagement between the pinion 15 and the rack 16A, so as to assist a steering torque which the driver applies to the steering shaft 12.

(Embodiment 1)

Figure 4:
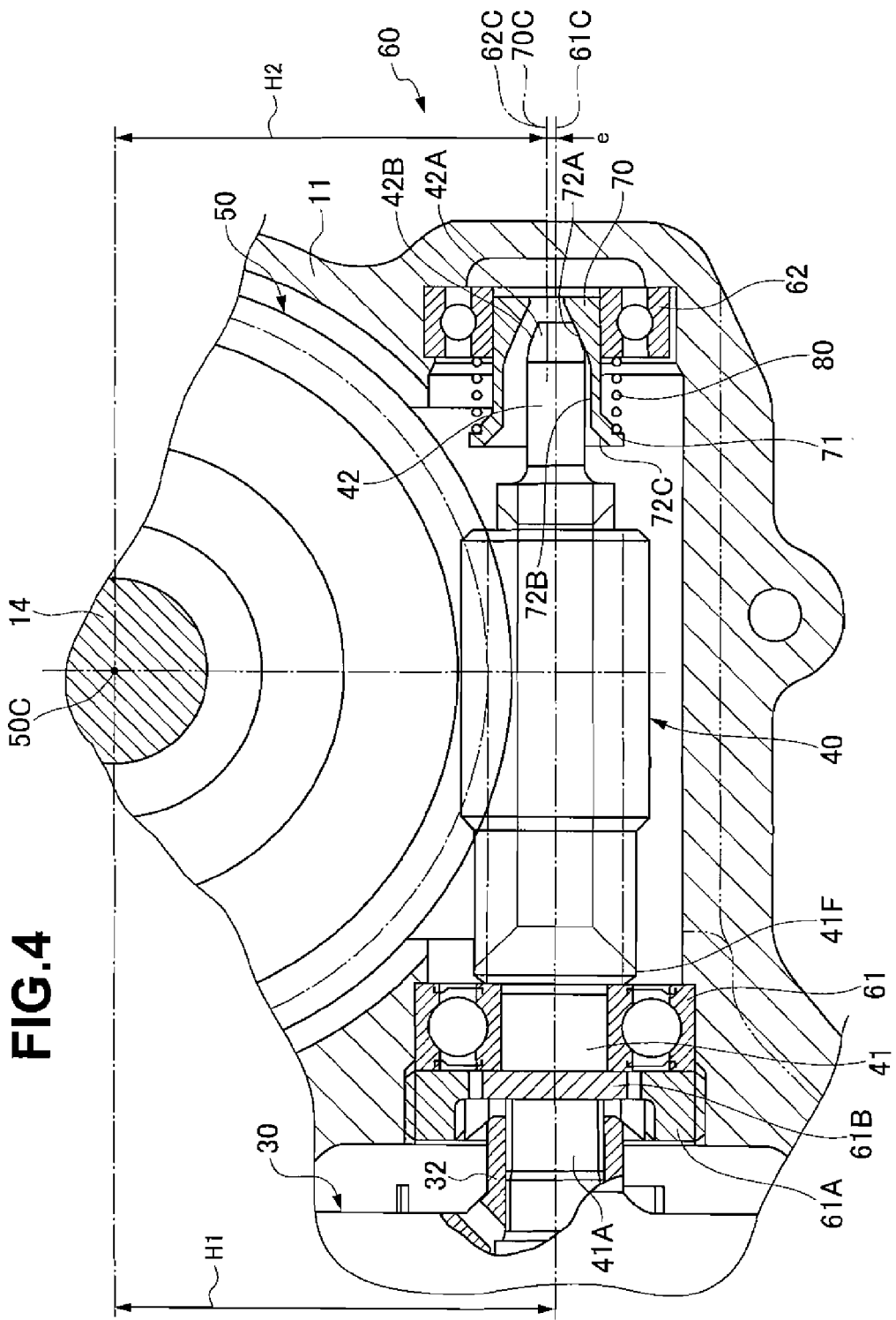
FIG. 4 is a cross sectional view showing a backlash regulating means in the embodiment 1.
Figure 5:
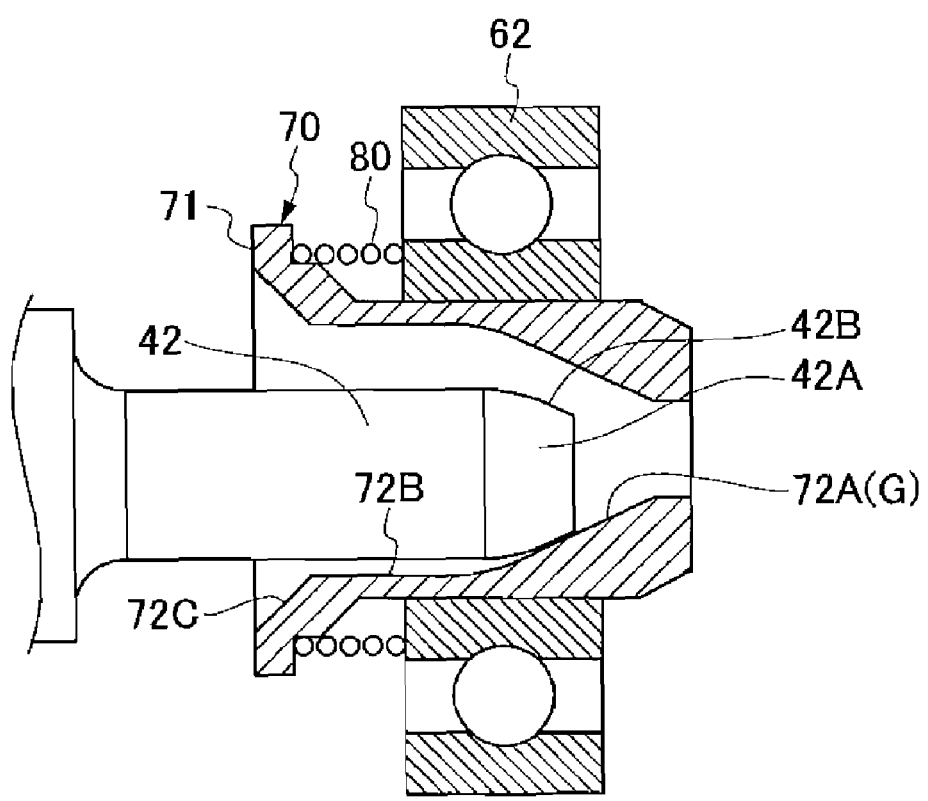
FIG. 5 is a cross sectional view showing a support state of a worm gear by a collar.
Figure 6:
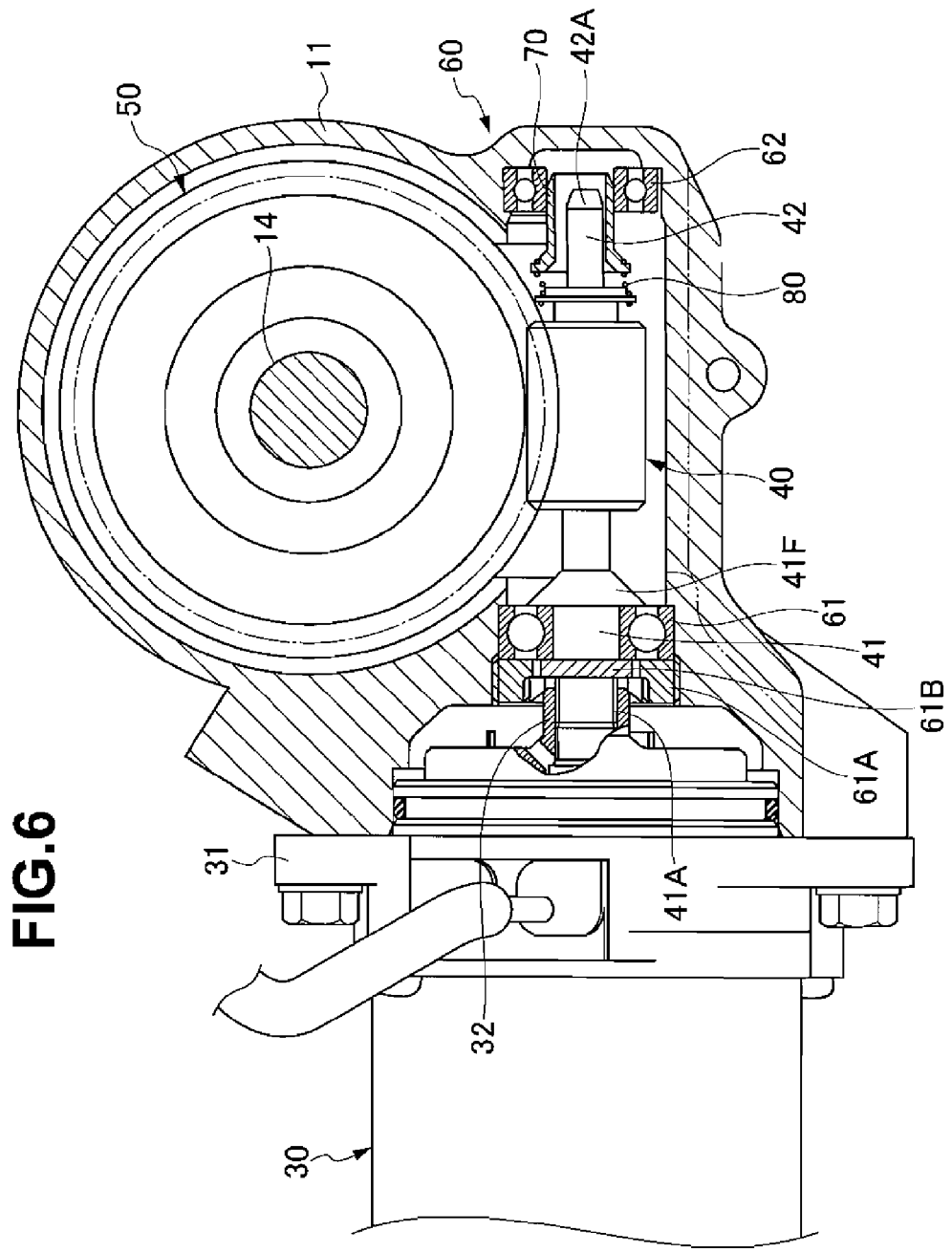
FIG. 6 is a cross sectional view along a line III-III in FIG. 2 in an embodiment 2.

Accordingly, the electric power steering apparatus 10 in the embodiment 1 supports the worm gear 40 with respect to the gear housing 11 as shown in FIGS. 4 and 5, and is provided with a backlash regulating means 60 between the worm gear 40 and the worm wheel 50 in a manner mentioned below.

A base end shaft 41 of the worm gear 40 provided while protruding in the electric motor 30 side is supported by a reference bearing 61 fixed to the gear housing 11. The reference bearing 61 is a ball bearing, for example, and an outer ring thereof is fitted to a hole provided in the gear housing 11, one end surface of the outer ring is supported struck against a surface of different level provided in the one side of the hole, and the other end surface of the outer ring is supported pressed by a nut 61A which is threaded to the other side of the hole. The base end shaft 41 of the worm gear 40 is inserted in an inner ring of the reference bearing 61, a flange portion 41F provided close to the worm gear 40 of the base end shaft 41 is supported struck against one end surface of the inner ring, and the other end surface of the inner ring is pressed by a nut 61B which is supported threaded close to the electric motor 30 of the base end shaft 41. The base end shaft 41 of the worm gear 40 may be fastened to the inner ring of the reference bearing 61 in accordance with a pressure insertion, a caulking or the like. As mentioned above, the base end shaft 41 of the worm gear 40 is fixed to the inner ring of the reference bearing 61, and the leading end 41A of the base end shaft 41 is spline coupled to the drive shaft 32 of the electric motor 30. A load in an axial direction applied to the worm gear 40 is supported by the reference bearing 61.

In this case, the reference bearing 61 is an angular ball bearing, for example, and oscillatorily supports a center shaft (the base end shaft 41 and a leading end shaft 42 mentioned below) of the worm gear 40 with respect to the gear housing 11.

The leading end shaft 42 (which is coaxial with the base end shaft 41) provided in a protruding manner in an opposite side to the electric motor 30 in the worm gear 40 is supported by a leading end bearing 62 fixed to the gear housing 11 via a collar 70. A support center 62C (which is identical to a center shaft 70C of the collar 70) of the leading end bearing 62 is biased by an amount of eccentricity e toward the worm wheel 50 with respect to a support center 61C of the reference bearing 61. Assuming that a center distance of the reference bearing 61 with respect to the center shaft 50C of the worm wheel 50 is set to H1, and a center distance of the leading end bearing 62 with respect to the center shaft 50C of the worm wheel 50 is set to H2, an expression H1=H2+e is satisfied. The leading end bearing 62 is a ball bearing, for example, an outer ring of which is pressure inserted and fixed to a hole provided in the gear housing 11.

The collar 70 is inserted in the inner ring of the leading end bearing 62 slidable in an axial direction with respect to an inner periphery of the inner ring (the collar 70 does not rotate relatively with respect to the inner ring of the leading bearing 60), and an elastically urging body 80 urging the collar 70 toward the worm gear 40 is interposed in a pre-compression state between a flange portion 71 provided in a side, to which the worm gear 40 protrudes from the inner ring of the leading end bearing 62, and an end surface of the inner ring of the leading end bearing 62. The elastically urging body 80 is a compression coil spring, for example (may be a disc spring or the like). The elastically urging body 80 is installed around an outer periphery of the collar 70 between the flange portion 71 of the collar 70 and the end surface of the inner ring of the leading end bearing 62.

The collar 70 is provided with a diameter enlarged inner diameter portion 72A formed in a taper shape (may be formed in a R shape) which has a diameter enlarged toward the worm gear 40, in an incorporated state in which it is inserted in the leading end bearing 62 and can be urged toward the worm gear 40 by the elastically urging body 80, and guides the leading end 42A of the leading end shaft 42 of the worm gear 40 incorporated in the gear housing 11 to the diameter enlarged inner diameter portion 72A of the collar 70 and then supports the leading end shaft 42 by pressing. The leading end 42A of the leading end shaft 42 of the worm gear 40 is supported slidable in the axial direction with respect to the diameter enlarged inner diameter portion 72A of the collar 70, and is supported so as to generally roll in a rotating direction (with a slight sliding motion).

In this case, the leading end 42A of the leading end shaft 42 of the worm gear 40 is provided with a R-shaped or taper-shaped, chamfer portion 42B which is supported by the diameter enlarged inner diameter portion 72A of the collar 70. Further, the leading end 42A of the leading end shaft 42 of the worm gear 40 is supported by the diameter enlarged inner diameter portion 72A of the collar 70 via a grease G.

The collar 70 is provided with a straight inner diameter portion 72B which is connected to a larger diameter end of the diameter enlarged inner diameter portion 72A, and a taper-shaped diameter enlarged opening portion 72C which is connected to the straight inner diameter portion 72B and widely opened to the worm gear 40. The leading end shaft 42 of the worm gear 40 is smoothly guided to a position capable of being supported by the diameter enlarged inner diameter portion 72A through the diameter enlarged opening portion 72C and the straight inner diameter portion 72B of the collar 70.

A backlash regulating motion between the worm gear 40 and the worm wheel 50 by the backlash regulating means 60 is as follows.

Since the leading end bearing 62 in which the collar 70 is inserted is biased toward the worm wheel 50 with respect to the support center 61C of the reference bearing 61, the leading end 42A of the leading end shaft 42 of the worm gear 40 is supported by the inner diameter portion 72A in the opposite side to the worm wheel 50 in the diameter enlarged inner diameter portion 72A of the collar 70. At this time the collar 70 is urged toward the worm gear 40 by the elastically urging body 80, and a part of the inner diameter portion 72A supporting the leading end 42A of the leading end shaft 42 of the worm gear 40 in the diameter enlarged inner diameter portion 72A of the collar 70 always pressurizes the worm gear 40 toward the worm wheel 50 on the basis of the contact angle with the collar 70, and can urge toward the worm wheel 50. Accordingly, the center distance between the worm gear 40 and the worm wheel 50 is always automatically regulated whichever at the assembling time and after the assembly, and it is possible to always regulate in such a manner that the backlash, caused by the dimensional error in the assembling state of them and the deterioration with age of the engaging state due to the abrasion or the like after the assembly, become zero.

In accordance with the present embodiment, the following operations and effects can be obtained.

(i) The collar 70 and the elastically urging body 80 included in the backlash regulating means 60 are provided in the inner side of the leading end bearing 62 in both the diametrical direction and the axial direction of the leading end bearing 62 for the leading end shaft 42 of the worm gear 40. Accordingly, the outer size of the electric power steering apparatus 10 does not become large in both the diametrical direction and the axial direction around the leading end bearing 62 for the worm gear 40, and it is possible to downsize the electric power steering apparatus 10.

(ii) The elastically urging body 80 urging the collar 70 toward the worm gear 40 is interposed between the flange portion 71 provided in the collar 70 at a side protruding from the leading end bearing 62 toward the worm gear 40, and the end surface of the leading end bearing 62. Accordingly, the elastically urging body 80 is provided in the inner side in the axial direction of the leading end bearing 62 for the worm gear 40, it is possible to install the elastically urging body 80 in a wide area of a free space around the protruding portion from the leading end bearing 62 of the collar 70 while downsizing the electric power steering apparatus 10, and a flexibility for designing the elastically urging body 80 is increased.

(iii) Since the constructing parts of the backlash regulating means 60 are constituted by the collar 70 and the elastically urging body 80, and do not accompany any screw portion, it is possible to improve an assembling property of the electric power steering apparatus 10.

(iv) The reference bearing 61 supporting the base end shaft 41 of the worm gear 40 oscillatorily supports the center shaft of the worm gear. Accordingly, it is possible to oscillate the worm gear 40 with respect to the reference bearing 61 so as to bias toward the worm wheel 50, by the pressurizing force which is generated by the diameter enlarged inner diameter portion 72A of the collar 70 pressuring the worm gear 40 toward the worm wheel 50.

(v) The leading end 42A of the leading end shaft 42 of the worm gear 40 is provided with the R-shaped or taper-shaped chamfer portion 42B supported by the diameter enlarged inner diameter portion 72A of the collar 70. Accordingly, it is possible to stably support the leading end 42A of the leading end shaft 42 of the worm gear 40 by the diameter enlarged inner diameter portion 72A of the collar 70.

(vi) The leading end 42A of the leading end shaft 42 of the worm gear 40 is supported by the diameter enlarged inner diameter portion 72A of the collar 70 via the grease G. Accordingly, it is possible to reduce the sliding friction supporting the leading end 42A of the leading end shaft 42 of the worm gear 40 by the diameter enlarged inner diameter portion 72A of the collar 70 so as to stably support.

In this case, in the electric power steering apparatus 10, the support center 62C of the leading end bearing 62 may be coaxially arranged (amount of eccentricity e=0) with respect to the support center 61C of the reference bearing 61. Also in this case, the worm gear 40 is supported in such a manner that the leading end 42A of the leading end shaft 42 of the worm gear 40 is always pressed by a part in a peripheral direction of the diameter enlarged inner diameter portion 72A of the collar 70 which is urged by the elastically urging body 80, and is always urged toward the coming close to the center shaft of the worm wheel 50. Accordingly, the center distance between the worm gear 40 and the worm wheel 50 is always automatically regulated whichever at the assembling time or after the assembly, and it is possible to regulate in such a manner that the backlash, caused by the dimensional error in the assembling stage of them, or the deterioration with age of the engaging state due to the abrasion or the like after the assembly, always becomes zero.

(Embodiment 2)

Figure 7:
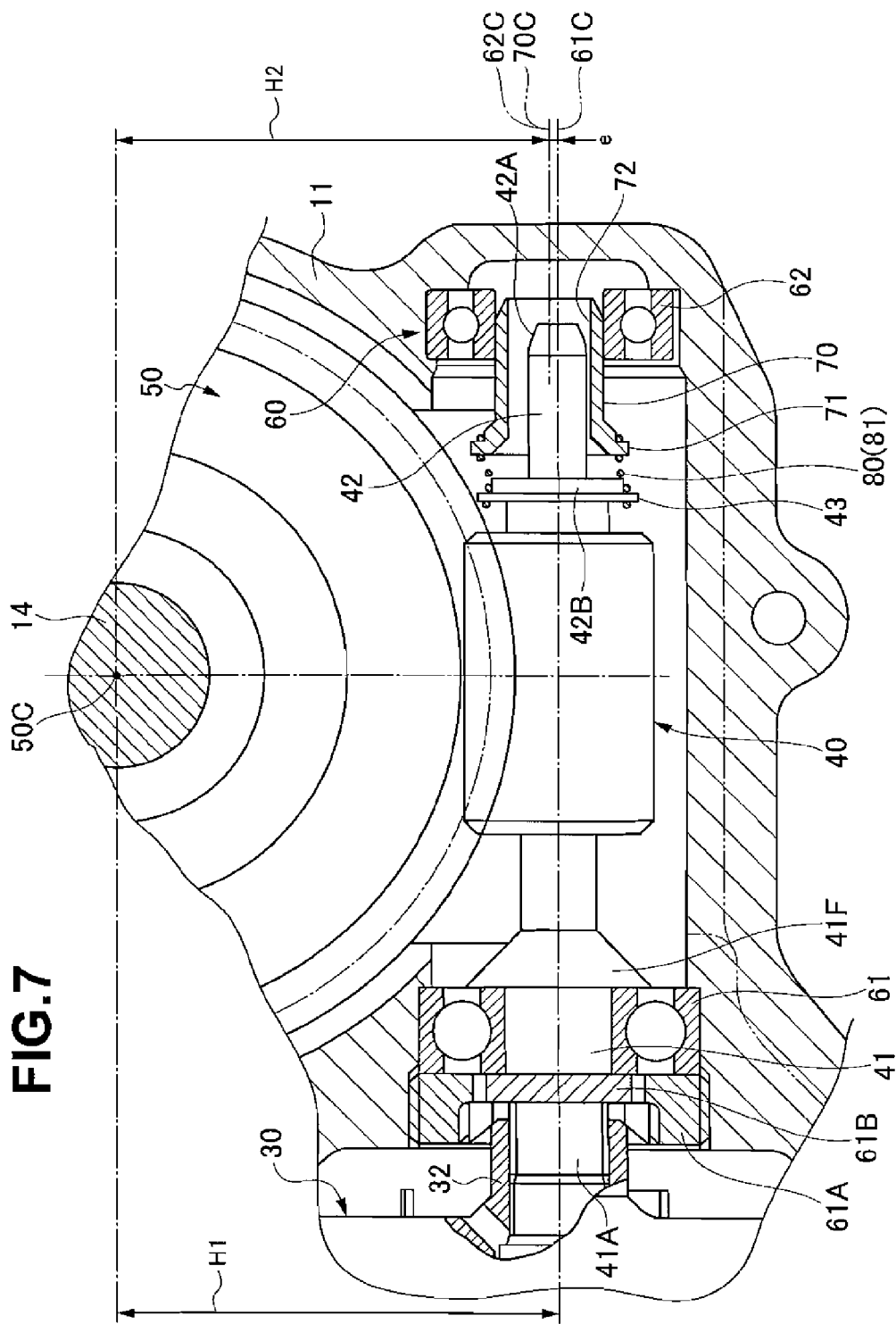
FIG. 7 is a cross sectional view showing a backlash regulating means in the embodiment 2.
Figure 8:
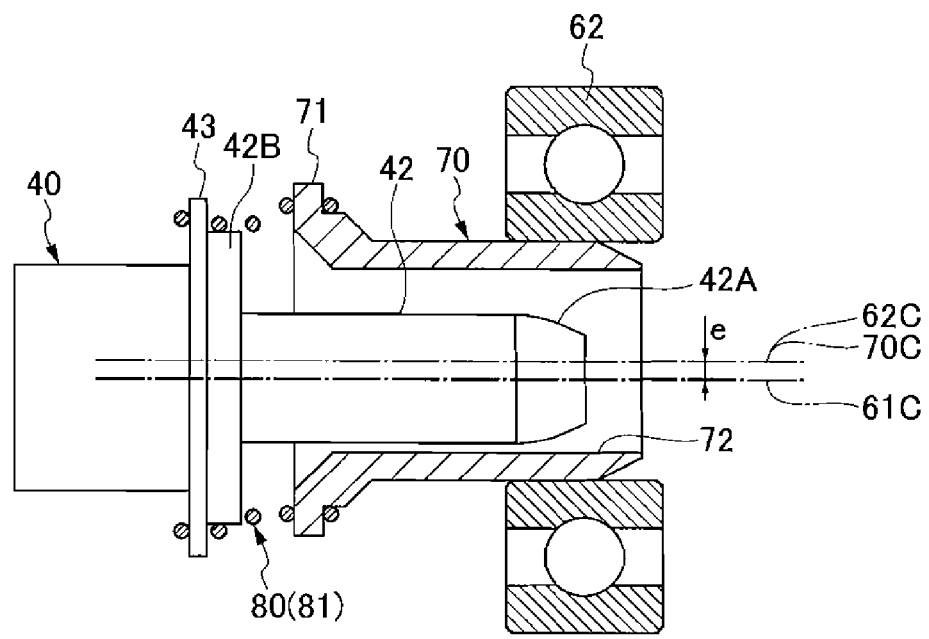
FIG. 8 is a cross sectional view showing a floating support state of the worm gear with respect to the collar.

The electric power steering apparatus 10 in the embodiment 2 supports the worm gear 40 with respect to the gear housing 11 as shown in FIGS. 7 and 8, and is provided with a backlash regulating means 60 between the worm gear 40 and the worm wheel 50 in a manner mentioned below.

A base end shaft 41 of the worm gear 40 provided while protruding in the electric motor 30 side is supported by a reference bearing 61 fixed to the gear housing 11. The reference bearing 61 is a ball bearing, for example, and an outer ring thereof is fitted to a hole provided in the gear housing 11, one end surface of the outer ring is supported struck against a surface of different level provided in the one side of the hole, and the other end surface of the outer ring is supported pressed by a nut 61A which is threaded to the other side of the hole. The base end shaft 41 of the worm gear 40 is inserted in an inner ring of the reference bearing 61, a flange portion 41F provided close to the worm gear 40 of the base end shaft 41 is supported struck against one end surface of the inner, and the other end surface of the inner ring is supported pressed by a nut 61B which is threaded close to the electric motor 30 of the base end shaft 41. The base end shaft 41 of the worm gear 40 may be fastened to the inner ring of the reference bearing 61 in accordance with a pressure insertion, a caulking or the like. As mentioned above, the base end shaft 41 of the worm gear 40 is fixed to the inner ring of the reference bearing 61, and the leading end 41A of the base end shaft 41 is spline coupled to the drive shaft 32 of the electric motor 30. A load in an axial direction applied to the worm gear 40 is supported by the reference bearing 61.

In this case, the reference bearing 61 is an angular ball bearing, for example, and oscillatorily supports a center shaft (the base end shaft 41 and a leading end shaft 42 mentioned below) of the worm gear 40 with respect to the gear housing 11.

The leading end bearing 62 is fixed to the gear housing 11. The worm gear 40 is provided between the leading end bearing 62 and the reference bearing 61. The leading end bearing 62 is a ball bearing, for example, and an outer ring thereof is pressure inserted and fixed to the hole provided in the gear housing 11.

A collar 70 is inserted in an inner ring of the leading end bearing 62 slidable in an axial direction with respect to an inner periphery of the inner ring (the collar 70 does not relatively rotate with respect to the inner ring of the leading end bearing 62). The collar 70 is provided with a flange portion 71 in an end portion outer periphery in a side protruding to the worm gear 40 side from the inner ring of the leading end bearing 62, and is provided with an inner diameter portion 72.

A leading end 42A of a leading end shaft 42 (which is coaxial with the reference shaft 41) provided in a protruding manner in an opposite side to the electric motor 30 in the worm gear 40 is loosely inserted in the inner diameter portion 72 of the collar 70. An outer diameter of the leading end 42A of the leading end shaft 42 is made smaller than an inner diameter of the inner diameter portion 72 of the collar 70.

The collar 70 is additionally provided with an elastically urging body 80 which is interposed between the collar 70 and a root portion 42B of the leading end shaft 42 of the worm gear 40. The elastically urging body 80 is a coil spring 81, for example, and is provided in such a manner as to surround an outer periphery of the leading end shaft 42 of the worm gear 40 and the collar 70, and each of both ends of the coil spring 81 is attached to each of the flange portion 71 of the collar 70, and the flange portion 43 provided in the root portion 42B of the leading end shaft 42 of the worm gear 40. Both ends of the coil spring 81 are attached to each of the flange portions 71 and 43 in a threading manner, and each of the flange portions 71 and 43 is pinched between element wires in both ends of the coil spring 81.

The worm gear 40 is always urged toward the coming close to the center shaft 50C of the worm wheel 50, by an urging force of the elastically urging body 80 interposed between the worm gear 40 and the collar 70.

At this time, a center of support 62C of the leading end bearing 62 (which is identical to the center shaft 70C of the collar 70) is biased only by an amount of eccentricity e toward the worm wheel 50 with respect to the center of support 61C of the reference bearing 61. Assuming that a center distance of the reference bearing 61 with respect to the center shaft 50C of the worm wheel 50 is set to H1, and a center distance of the leading end bearing 62 with respect to the center shaft 50C of the worm wheel 50 is set to H2, an expression H1=H2+e is satisfied. Further, assuming that a center distance between both the elements at a time of engaging the worm gear 40 and the worm wheel 50 with no backlash (zero backlash) is set to H0, an expression H0>H2 is satisfied. Further, the elastically urging body 80 urges the leading end shaft 42 of the worm gear 40 in such a manner as to be aligned with the center shaft 70C of the collar 70 (urges in a direction coming close thereto). Further, the elastically urging body 80 supports in a floating manner the leading end 42A of the leading end shaft 42 of the worm gear 40 with respect to the inner diameter portion 72 of the collar 70.

A backlash regulating motion between the worm gear 40 and the worm wheel 50 by the backlash regulating means 60 is as follows.

The leading end bearing 62 and the collar 70 are biased toward the worm wheel 50 with respect to the center of support 61C of the reference bearing 61, the elastically urging body 80 (the coil spring 81) urges the leading end shaft 42 of the worm gear 40 in a direction coming close to the center shaft 70C of the collar 70, and always urges the worm gear 40 toward the side coming close to the center shaft 50C of the worm wheel 50. Accordingly, the center distance between the worm gear 40 and the worm wheel 50 is always automatically regulated during or after the assembly, and it is possible to always regulate in such a manner that the backlash, caused by the dimensional error in the assembling stage of them, or the deterioration with age of the engaging state due to the abrasion or the like after the assembly, always becomes zero.

In accordance with the present embodiment, the following operations and effects can be obtained.

(a) The collar 70 is provided with the elastically urging body 80 which is interposed between the collar 70 and the root portion 42B of the leading end shaft 42 of the worm gear 40, and the worm gear 40 is always urged toward the side coming close to the center shaft of the worm wheel 50 by the urging force of the elastically urging body 80 interposed between the worm gear 40 and the collar 70. Accordingly, the center distance between the worm gear 40 and the worm wheel 50 is regulated in such a manner as to always automatically eliminate the backlash between both the elements whichever at the assembling time or after the assembly, and it is possible to regulate in such a manner that the backlash, caused by the dimensional error in the assembling stage or the deterioration with age of the engaging state due to the abrasion or the like after the assembly, always becomes zero.

(b) The collar 70 and the elastically urging body 80 included in the backlash regulating means 60 are provided in the inner side of the leading end bearing 62 in both the diametrical direction and the axial direction of the leading end bearing 62 for the leading end shaft 42 of the worm gear 40. Accordingly, the outer size of the electric power steering apparatus 10 does not become large in both the diametrical direction and the axial direction around the leading end bearing 62 for the worm gear 40, and it is possible to achieve the downsizing of the electric power steering apparatus 10.

(c) The elastically urging body 80 is interposed between the collar 70 and the root portion 42B of the leading end shaft 42 of the worm gear 40. Accordingly, the elastically urging body 80 is provided in the inner side in the axial direction of the leading end bearing 62 for the worm gear 40, it is possible to install the elastically urging body 80 in a wide area of a free space between the collar 70 and the root portion 42B of the leading end shaft 42 of the worm gear 40 while downsizing of the electric power steering apparatus 10, and a flexibility for designing the elastically urging body 80 is increased.

(d) The constructing parts of the backlash regulating means 60 are constituted by the collar 70 and the elastically urging body 80, and which does not accompany any screw portion, it is possible to improve an assembling property of the electric power steering apparatus 10.

(e) The leading end bearing 62 and the collar 70 are biased toward the worm wheel 50 with respect to the center of support of the reference bearing 61, and the elastically urging body 80 urges the leading end shaft 42 of the worm gear 40 aligned with the center shaft of the collar 70. Accordingly, the worm gear 40 is always securely urged toward the side coming close to the center shaft of the worm wheel 50 by the urging force of the elastically urging body 80 interposed between the worm gear 40 and the collar 70.

(f) The elastically urging body 80 is the coil spring 81, and each of both the ends of the coil spring 81 is attached to each of the collar 70 and the root portion 42B of the leading end shaft 42 of the worm gear 40. Accordingly, it is possible to easily align the leading end shaft 42 of the worm gear 40 with the center shaft of the collar 70 by the elastically urging body 80, which is the coil spring 81.

(g) The elastically urging body 80, which is the coil spring 81, supports in a floating manner the leading end 42A of the leading end shaft 42 of the worm gear 40 with respect to the inner diameter portion 72 of the collar 70. Accordingly, the worm gear 40 is always urged toward the side coming close to the center shaft of the worm wheel 50 in a state of being supported in a floating manner by the elastically urging body 80, and it is possible to always automatically eliminate the backlash between both the elements without increasing any friction between the worm gear 40 and the worm wheel 50.

(h) The reference bearing 61 supporting the base end shaft 41 of the worm gear 40 oscillatorily supports the center shaft of the worm gear 40. Accordingly, it is possible to oscillate the worm gear 40 with respect to the reference bearing 61 by the urging force of the elastically urging body 80 with respect to the collar 70 so as to make it displace to the side coming close to the center shaft of the worm wheel 50, and it is possible to eliminate the backlash between the worm gear 40 and the worm wheel 50.

Figure 9:
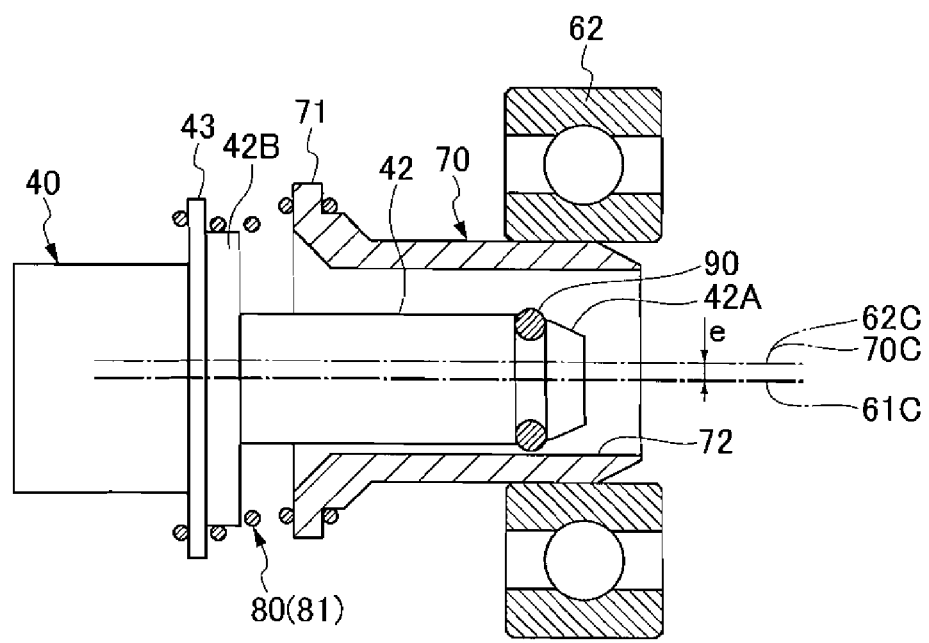
FIG. 9 is a cross sectional view showing a modified embodiment of the floating support state of the worm gear with respect to the collar.

FIG. 9 shows a structure in which an O-ring (an elastic body) 90 is attached to an annular groove provided in an outer periphery of a leading end 42A of a leading end shaft 42 of a worm gear 40 in a floating support state of the worm gear 40 with respect to a collar 70. In accordance with this structure, even if the leading end 42A of the leading end shaft 42 of the worm gear 40 which is supported in a floating manner by an elastically urging body 80 of a coil spring 81 comes into collision with an inner diameter portion 72 of the collar 70 on the basis of its floating, the O-ring 90 in a leading end outer periphery of the leading end shaft 42 can absorb a shock due to the collision and it is possible to prevent the slapping sound.

Figure 10:
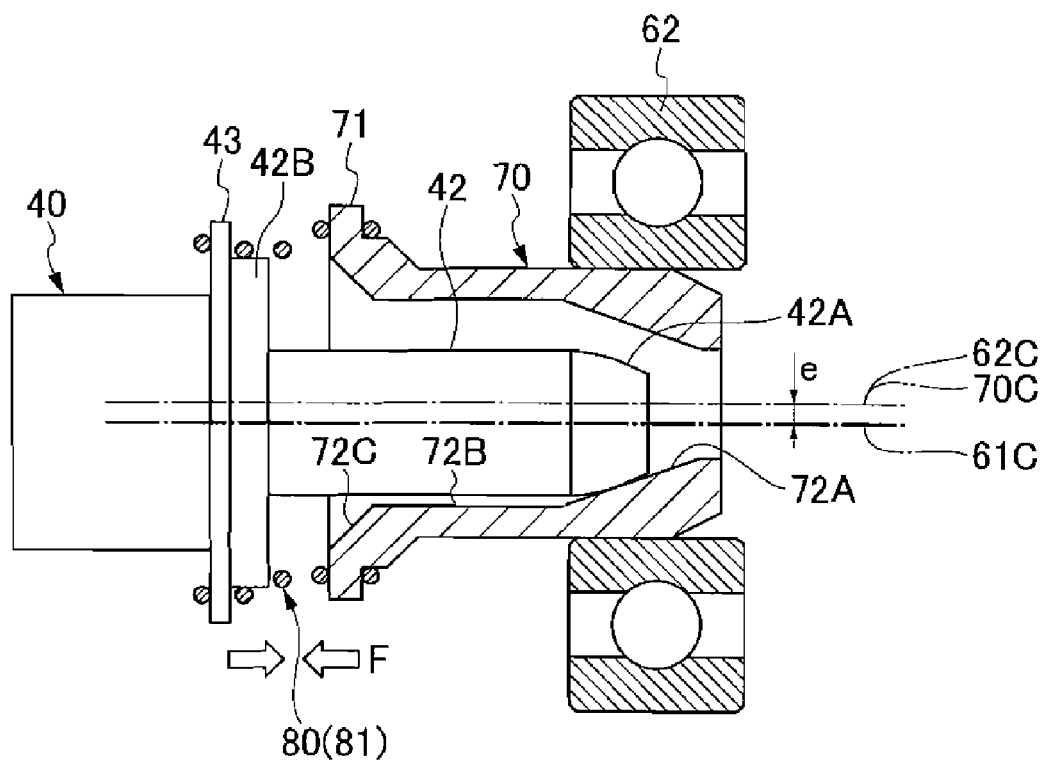
FIG. 10 is a cross sectional view showing a modified embodiment of the floating support state of the worm gear with respect to the collar.

FIG. 10 shows a structure in which a collar 70 is provided with a taper-shaped diameter enlarged inner diameter portion 72A having a diameter enlarging toward a worm gear 40 side in a floating support state of the worm gear 40 with respect to the collar 70, and a taper-shaped leading end 42A of a leading end shaft 42 of the worm gear 40 is supported by the diameter enlarged inner diameter portion 72A of the collar 70. At this time, a coil spring 81 of an elastically urging body 80 is previously applied a retracting force F (FIG. 10) pulling-in a flange portion 71 of the collar 70 to a flange portion 43 provided in a root portion 42B of a leading end shaft 42 of the worm gear 40, and always securely brings the leading end 42A of the leading end shaft 42 of the worm gear 40 into contact with the diameter enlarged inner diameter portion 72A of the collar 70. In accordance with this structure, the leading end 42A of the leading end shaft 42 of the worm gear 40 which is supported in a floating manner by the elastically urging body 80 of the coil spring 81 is supported struck against the diameter enlarged inner diameter portion 72A of the collar 70, the leading end 42A of the leading end shaft 42 of the worm gear 40 is supported in a floating manner without any backlash with respect to the inner diameter portion 72 of the collar 70. Accordingly, it is possible to prevent the collision with the inner diameter portion 72 of the collar 70 during the floating from being generated, while supporting the worm gear 40 by the elastically urging body 80 in a floating manner, and it is possible to avoid the slapping sound.

In this case, the collar 70 is provided with a straight-shaped inner diameter portion 72B which is connected to a larger diameter end of the diameter enlarged inner diameter portion 72A, and a taper-shaped diameter enlarged opening portion 72C which is connected to the straight-shaped inner diameter portion 72B and is widely expanded to the worm gear 40. The leading end shaft 42 of the worm gear 40 is smoothly guided to a position capable of being supported by the diameter enlarged inner diameter portion 72A through the diameter enlarged opening portion 72C and the straight-shaped inner diameter portion 72B of the collar 70.

(Embodiment 3)

An electric power steering apparatus 10 in accordance with an embodiment 3 supports a worm gear 40 with respect to a gear housing 11 as shown in FIGS. 11 to 15, and is provided with a friction and abnormal noise preventing means 60 of a worm gear 40 and a worm wheel 50 in a manner mentioned below.

A base end shaft 41 provided in a protruding manner in an electric motor 30 side in the worm gear 40 is supported by a reference bearing 61 fixed to a gear housing 11. The reference bearing 61 is constructed, for example, by a ball bearing, and is structured such that an outer ring is fitted to a hole provided in the gear housing 11, an one end surface of the outer ring is supported struck against a step surface provided in one side of the hole, and the other end surface of the outer ring is supported pressed by a nut 61A screwed to the other side of the hole. The base end shaft 41 of the worm gear 40 is inserted in an inner ring of the reference bearing 61, a flange portion 41F provided close to the worm gear 40 of the base end shaft 41 is supported struck against one end surface of the inner ring, and the other end surface of the inner ring is supported pressed by a nut 61B to the base end shaft 41 at a position close to the electric motor 30. The base end shaft 41 of the worm gear 40 may be fastened to the inner ring of the reference bearing 61 in accordance with a pressure insertion, a caulking or the like. Accordingly, the base end shaft 41 of the worm gear 40 is fixed to the inner ring of the reference bearing 61, and the leading end 41A of the base end shaft 41 is spline coupled to a drive shaft 32 of the electric motor 30. A load in an axial direction applied to the worm gear 40 is supported by the reference bearing 61.

In this case, the reference bearing 61 is constructed, for example, by an angular ball bearing, and oscillatorily supports a center shaft (a reference end shaft 41 and a leading end shaft 42 mentioned below) of the worm gear 40 with respect to the gear housing 11.

The leading end shaft 42 of the worm gear 40 (which is coaxial with the base end shaft 41) provided while protruding in an opposite side to the electric motor 30 is supported by a leading end bearing 62 fixed to the gear housing 11 via a collar 70. A center of support 62C (which is identical to a center shaft 70C of a collar 70) of the leading end bearing 62 is coaxially arranged with a center of support 61C of the reference bearing 61. The leading end bearing 62 is constructed, for example, by a ball bearing, and an outer ring thereof is pressure inserted and fixed to a hole provided in the gear housing 11.

The collar 70 is inserted in an inner periphery of the inner ring of the bearing 62 slidable in an axial direction (the collar 70 does not rotate relatively with respect to the inner ring of the bearing 60), and an elastically urging body 80 urging the collar 70 toward the worm gear 40 is interposed in a precompression state between a flange portion 71 provided in a side protruding to the worm gear 40 side from the inner ring of the bearing 62, and an end surface of the inner ring of the bearing 62. The elastically urging body 80 is a compression coil spring (may be a disc spring or the like). The elastically urging body 80 is installed around an outer periphery of the collar 70 between the flange portion 71 of the collar 70 and the end surface of the inner ring of the leading end bearing 62.

The collar 70 is provided with a diameter enlarged inner diameter portion 72A formed in a taper shape (may be formed as a R shape) which is diameter enlarged toward the worm gear 40 side, under an incorporated state in which it is inserted in the bearing 62 and can be urged by the elastically urging body 80, and guides the leading end 42A of the leading end shaft 42 of the worm gear 40 incorporated in the gear housing 11 to the diameter enlarged inner diameter portion 72A of the collar 70 so as to press and support. The leading end 42A of the leading end shaft 42 of the worm gear 40 is supported slidable in the axial direction with respect to the diameter enlarged inner diameter portion 72A of the collar 70, and is supported so as to approximately roll (accompanying a slight sliding motion) in a rotating direction.

In this case, the leading end 42A of the leading end shaft 42 of the worm gear 40 is provided with a R-shaped or taper-shaped chamfer portion 42B which is supported by the diameter enlarged inner diameter portion 72A of the collar 70. Further, the leading end 42A of the leading end shaft 42 of the worm gear 40 is supported by the diameter enlarged inner diameter portion 72A of the collar 70 via a grease G.

The collar 70 is provided with a straight inner diameter portion 72B which is connected to a larger diameter end of the diameter enlarged inner diameter portion 72A, and a taper-shaped diameter enlarged opening portion 72C which is connected to the straight inner diameter portion 72B so as to widely opened to the worm gear 40 side. The leading end shaft 42 of the worm gear 40 is smoothly guided to a position supported by the diameter enlarged inner diameter portion 72A via the diameter enlarged opening portion 72C and the straight inner diameter portion 72B of the collar 70.

A friction and abnormal noise preventing motion between the worm gear 40 and the worm wheel 50 by the friction and abnormal noise preventing means 60 is as follows.

The leading end 42A of the leading end shaft 42 of the worm gear 40 is supported by the diameter enlarged inner diameter portion 72A of the collar 70. At this time, the collar 70 is urged in the axial direction heading for the worm gear 40 by the elastically urging body 80.

Figure 11:
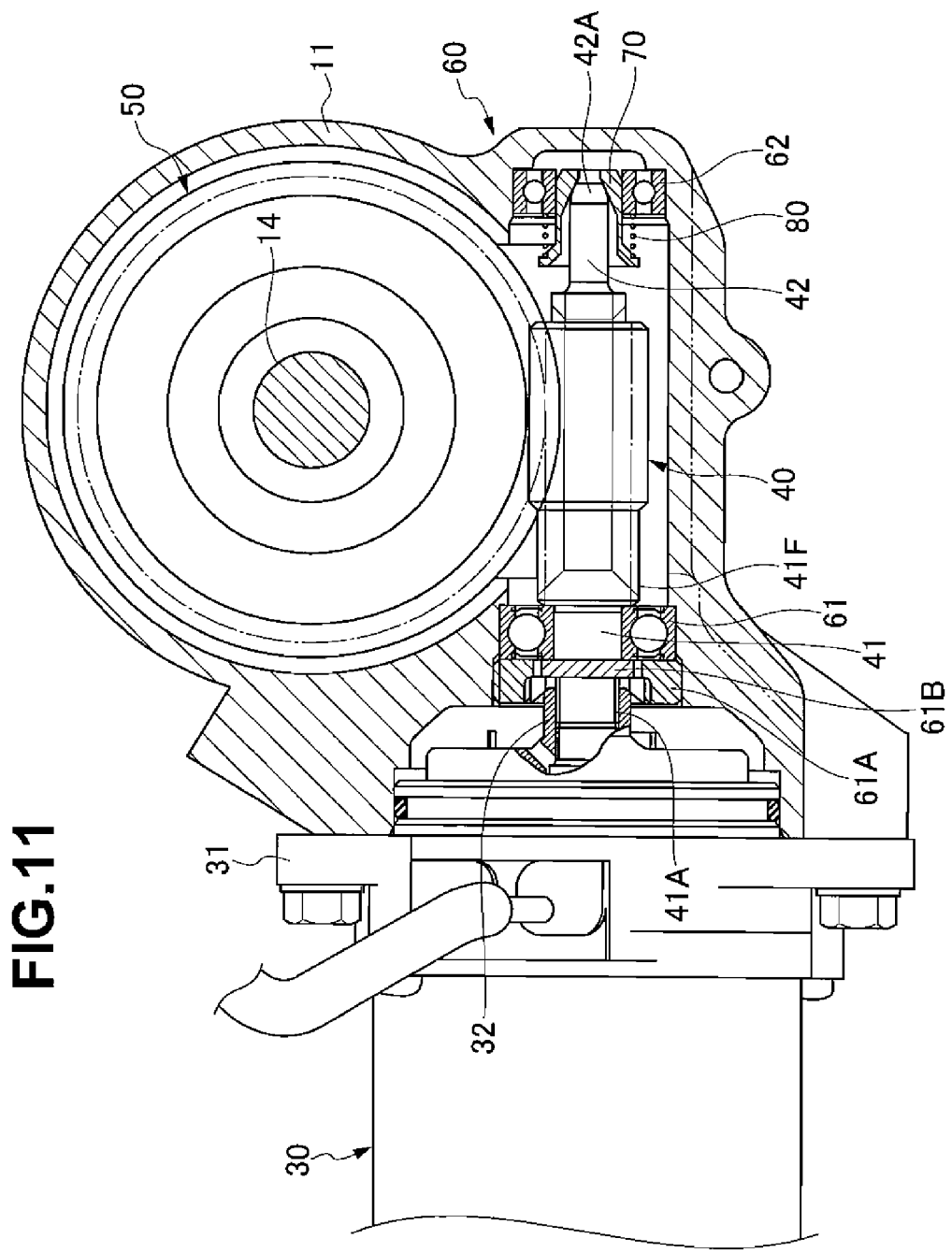
FIG. 11 is a cross sectional view showing a neutral state of the worm gear, along a line III-III in FIG. 2 in an embodiment 3.
Figure 12:
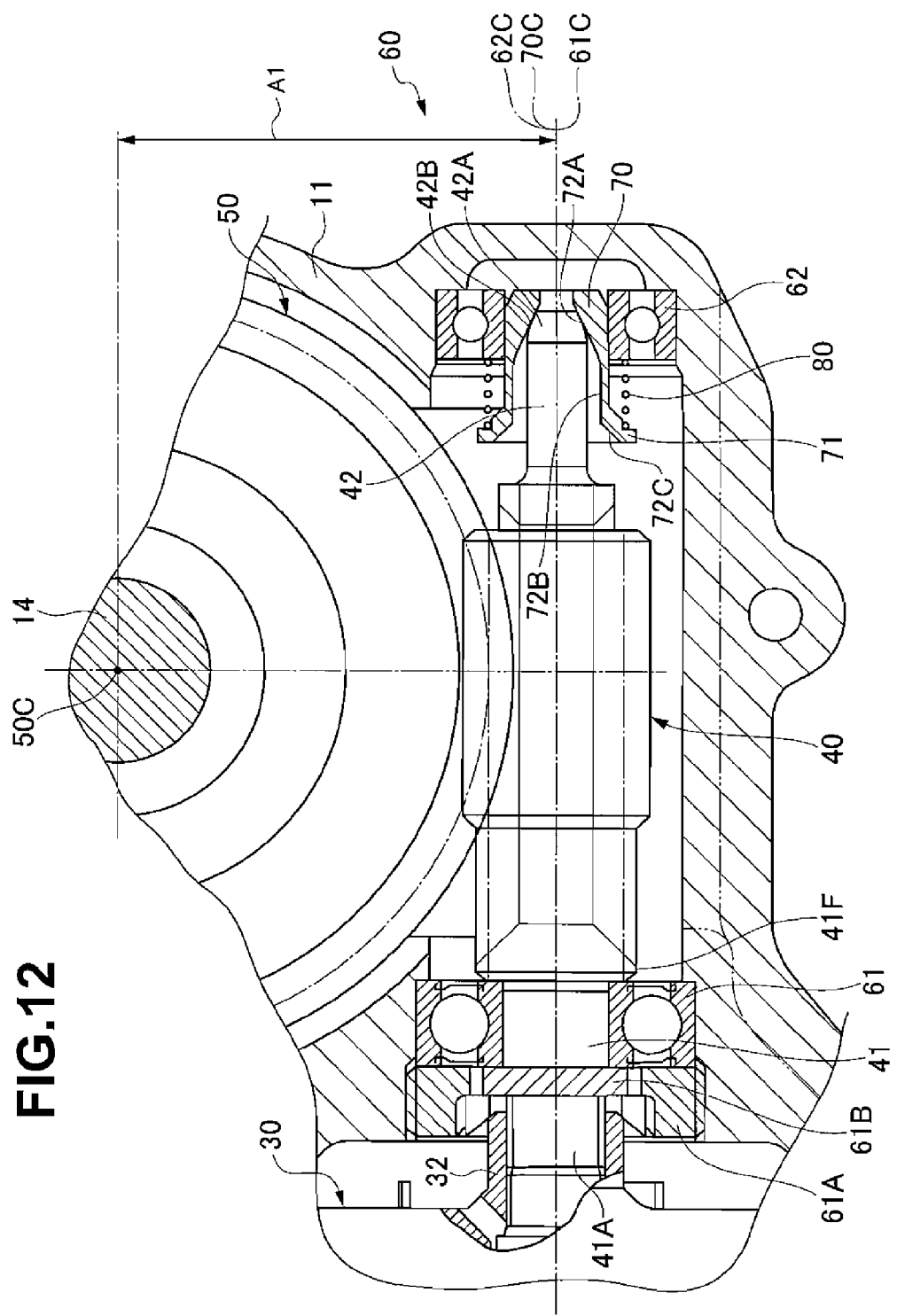
FIG. 12 is an enlarged cross sectional view of a substantial part in FIG. 3 in the embodiment 3.
Figure 15A:
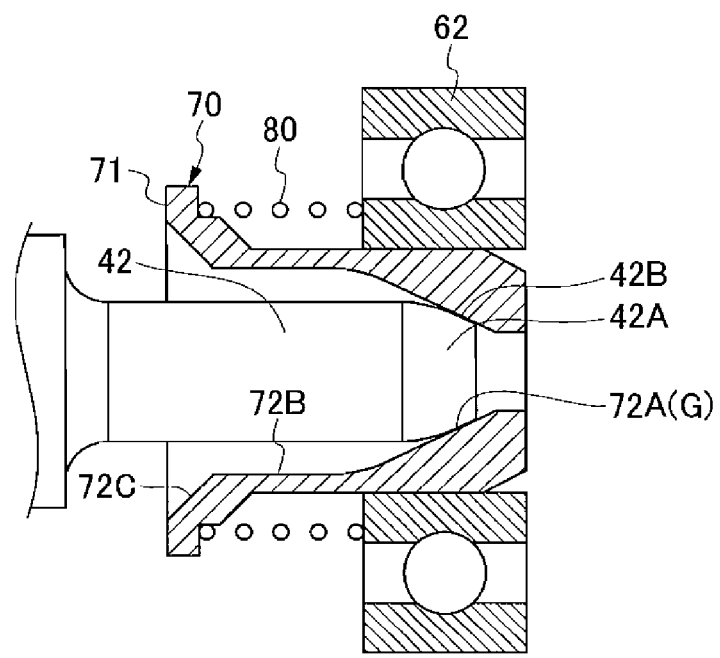

When the motor 30 (the worm gear 40) is not rotated, a whole periphery of the leading end 42A of the leading end shaft 42 of the worm gear 40 is seated on a whole periphery of the diameter enlarged inner diameter portion 72A of the collar 70, and a center shaft of the worm gear 40 is set at a neutral position which is coaxial with the center shaft of the collar 70. At this time, the center shafts of the worm gear 40 and the collar 70 are coaxial, and a suitable backlash (a zero backlash or a fixed backlash) is set between the worm gear 40 and the worm wheel 50 (FIG. 15A). Further, the collar 70 is urged toward the worm gear 40 by the elastically urging body 80, and a center distance between the worm gear 40 and the worm wheel 50 is A1 (FIGS. 11 and 12).

Figure 13:
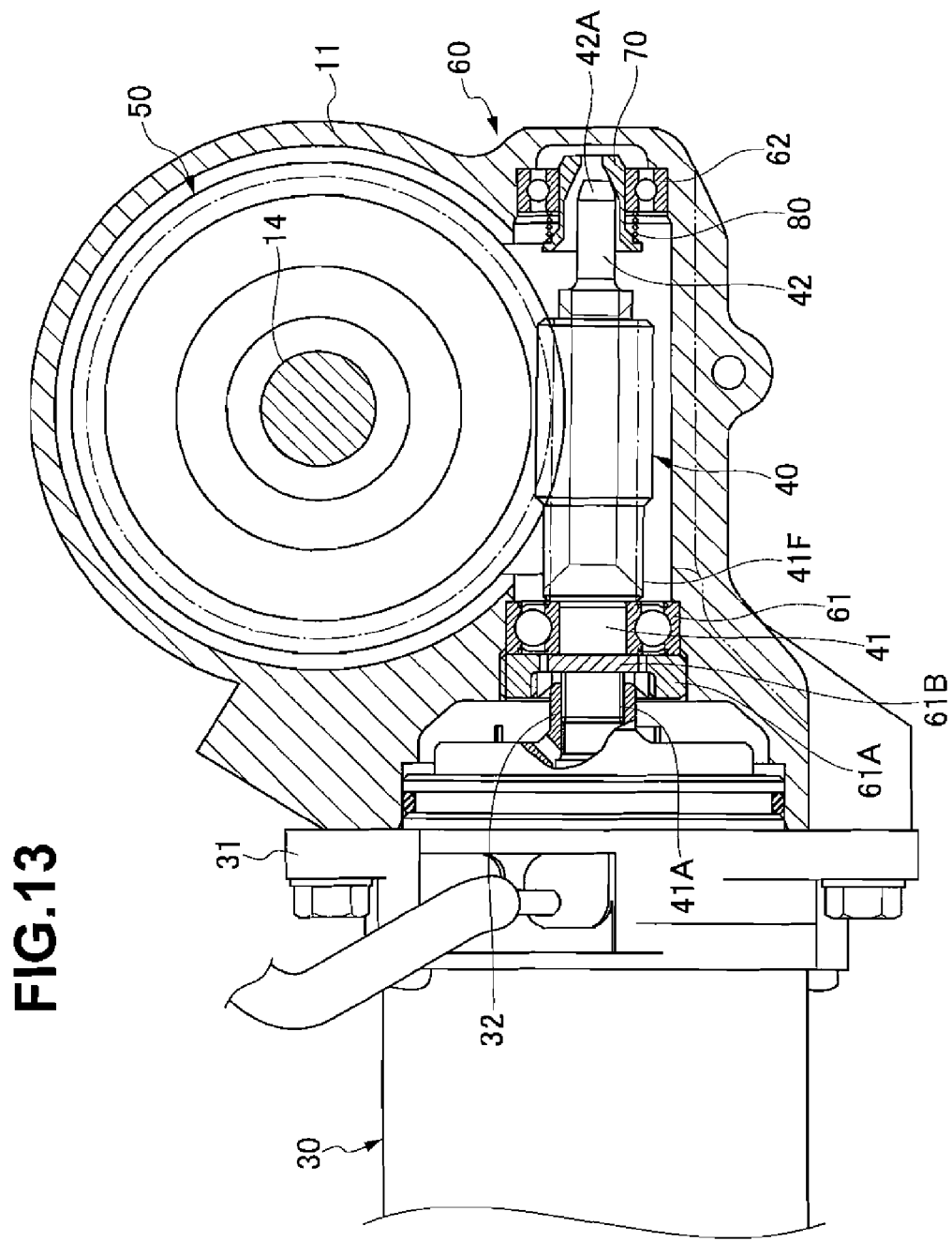
FIG. 13 is a cross sectional view showing a biased state of the worm gear.
Figure 15B:
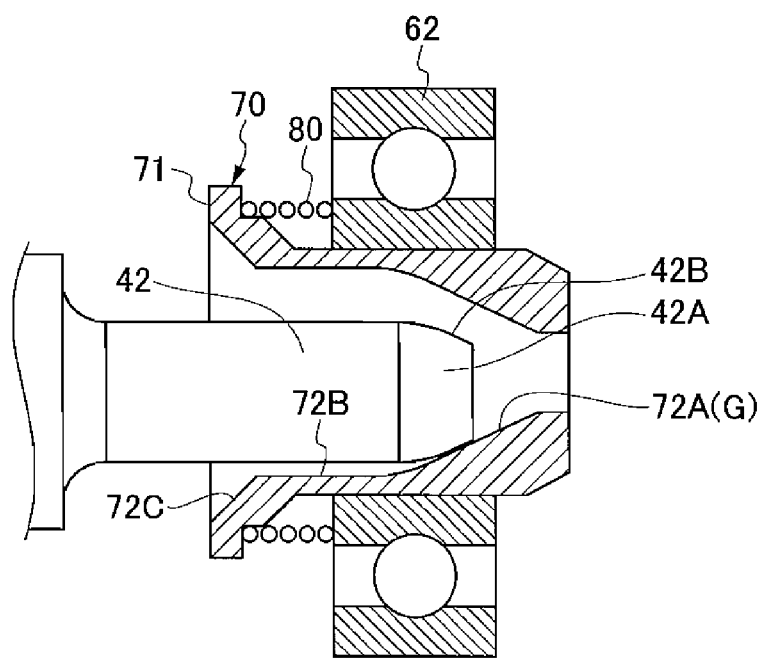

On the other hand, when the motor 30 (the worm gear 40) is rotated, it is possible to support the leading end 42A of the leading end shaft 42 of the worm gear 40 which is away from the center shaft of the worm wheel 50 by a rotational contact pressure between a tooth surface of the worm gear 40 and a tooth surface of the worm wheel 50 by a part in a peripheral direction of the diameter enlarged inner diameter portion 72A of the collar 70 which is urged by the elastically urging body 80. At this time, the leading end 42A of the leading end shaft 42 of the worm gear 40 is actuated in such a manner as to press the collar 70 to the bearing 62 against the urging force of the elastically urging body 80, and the worm gear 40 is biased toward an opposite to the worm wheel 50 (FIG. 15B). Accordingly, it is possible to soften the collision between the tooth surfaces by increasing a center distance A2 (letting the worm gear 40 out of the worm wheel 50) (in which the backlash is increased), at a time when the worm gear 40 and the worm wheel 50 are engaged by the rotation of the motor 30, and it is possible to reduce the abnormal noise generated by the collision between both the elements. Further, it is possible to prevent the friction from being increased at a time when both the elements are engaged, by increasing the center distance between the worm gear 40 and the worm wheel 50 (FIGS. 13 and 14).

In accordance with the present embodiment, the following operations and effects can be obtained.

(i) The collar 70 and the elastically urging body 80 constructing the friction and abnormal noise preventing means 60 are provided in the inner side of the bearing 62 in both the diametrical direction and the axial direction of the bearing 62 for the leading end shaft 42 of the worm gear 40. Accordingly, the outer size of the electric power steering apparatus 10 does not become large in both the diametrical direction and the axial direction around the eccentric bearing 62 for the worm gear 40, and it is possible to downsize the electric power steering apparatus 10.

(ii) The elastically urging body 80 urging the collar 70 toward the worm gear 40 is interposed between the flange portion 71 provided in the side protruding from the leading end bearing 62 of the collar 70 toward the worm gear 40, and the end surface of the leading end bearing 62. Accordingly, the elastically urging body 80 is provided in the inner side in the axial direction of the leading end bearing 62 for the worm gear 40, it is possible to install the elastically urging body 80 in a wide area of a free space around the protruding portion from the leading end bearing 62 of the collar 70 while intending to downsize the electric power steering apparatus 10, and a flexibility for designing the elastically urging body 80 is increased.

(iii) Since the constructing parts of the friction and abnormal noise preventing means 60 are constituted by the collar 70 and the elastically urging body 80, and do not accompany any screw portion, it is possible to improve an assembling property of the electric power steering apparatus 10.

(iv) The reference bearing 61 supporting the base end shaft 41 of the worm gear 40 oscillatorily supports the center shaft of the worm gear 40. Accordingly, it is possible to oscillate the worm gear 40 with respect to the reference bearing 61 so as to bias to the opposite side to the worm wheel 50.

(v) The leading end 42A of the leading end shaft 42 of the worm gear 40 is provided with the R-shaped or taper-shaped chamfer portion 42B supported by the diameter enlarged inner diameter portion 72A of the collar 70. Accordingly, it is possible to stably support the leading end 42A of the leading end shaft 42 of the worm gear 40 by the diameter enlarged inner diameter portion 72A of the collar 70.

(vi) The leading end 42A of the leading end shaft 42 of the worm gear 40 is supported by the diameter enlarged inner diameter portion 72A of the collar 70 via the grease G. Accordingly, it is possible to reduce the sliding friction supporting the leading end 42A of the leading end shaft 42 of the worm gear 40 by the diameter enlarged inner diameter portion 72A of the collar 70 so as to stably support.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

According to the present invention, it is possible to improve a downsizing, a flexibility for designing and an assembling property of an electric power steering apparatus, while making it possible to eliminate a backlash between a worm gear and a worm wheel, in the electric power steering apparatus.

Furthermore, according to the present invention, it is possible to prevent an abnormal noise while preventing an increase of a friction caused by an engagement between the worm gear and the worm wheel, in the electric power steering apparatus and improve a downsizing, a flexibility for designing and an assembling property of the electric power steering apparatus.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. An electric power steering apparatus, comprising: a worm gear coupled to a drive shaft of an electric motor is rotatably mounted in a gear housing, and a worm wheel fixed to an intermediate portion of a steering shaft and engaged with the worm gear is rotatably mounted in the gear housing, wherein a base end shaft close to the electric motor in the worm gear is supported by a reference bearing fixed to the gear housing, a leading end shaft in an opposite side to the electric motor in the worm gear is supported by a leading end bearing fixed to the gear housing via a collar, the collar is inserted in the leading end bearing slidable in an axial direction, and an elastically urging body urging the collar toward the worm gear is interposed between a flange portion of the collar provided in a side protruding from the leading end bearing toward the worm gear and an end surface of the leading end bearing, the collar is provided with a diameter enlarged inner diameter portion which is diameter enlarged toward the worm gear, and is dimensioned to support a leading end of a leading end shaft of the worm gear to the diameter enlarged inner diameter portion of the collar, and the worm gear is supported by always pressing the leading end of the leading end shaft of the worm gear by a part in a peripheral direction of the diameter enlarged inner diameter portion of the collar urged by the elastically urging body, and is always urged toward a side coming close to a center shaft of the worm wheel.

2. The electric power steering apparatus according to claim 1, wherein the reference bearing oscillatorily supports the center shaft of the worm gear.

3. The electric power steering apparatus according to claim 1, wherein the leading end of the leading end shaft of the worm gear is provided with a R-shaped or taper-shaped chamfer portion supported by the diameter enlarged inner diameter portion of the collar.

4. The electric power steering apparatus according to claim 1, wherein the leading end of the leading end shaft of the worm gear is supported by the diameter enlarged inner diameter portion of the collar via a grease.

5. The electric power steering apparatus according to claim 1, wherein the leading end bearing is biased toward the worm wheel with respect to the center of support of the reference bearing.

6. An electric power steering apparatus having a worm gear coupled to a drive shaft of an electric motor and rotatably mounted in a gear housing, and having a worm wheel fixed to an intermediate portion of a steering shaft engaged with the worm gear is rotatably mounted in the gear housing, wherein a base end shaft close to the electric motor in the worm gear is supported by a reference bearing fixed to the gear housing, a leading end shaft in an opposite side to the electric motor in the worm gear is supported by a leading end bearing fixed to the gear housing via a collar, the collar is inserted in the leading end bearing slidable in an axial direction, and an elastically urging body urging the collar toward the worm gear is interposed between a flange portion of the collar provided in a side protruding from the leading end bearing toward the worm gear and an end surface of the leading end bearing, the collar is provided with a diameter enlarged inner diameter portion which is diameter enlarged toward the worm gear, and is dimensioned to support a leading end of a leading end shaft of the worm gear to the diameter enlarged inner diameter portion of the collar, and a center shaft of the worm gear is set at a neutral position which is coaxial with a center shaft of the collar, by making a whole periphery of the leading end of the leading end shaft of the worm gear seat on a whole periphery of the diameter enlarged inner diameter portion of the collar, at a time when the motor does not rotate, and the leading end of the leading end shaft of the worm gear which is away from the center shaft of the worm wheel by a rotational contact pressure between a tooth surface of the worm gear and a tooth surface of the worm wheel is supported by a part in a peripheral direction of the diameter enlarged inner diameter portion of the collar which is urged by the elastically urging body, at a time when the motor rotates.

7. The electric power steering apparatus according to claim 6, wherein the reference bearing oscillatorily supports the center shaft of the worm gear.

8. The electric power steering apparatus according to claim 6, wherein the leading end of the leading end shaft of the worm gear is provided with a R-shaped or taper-shaped chamfer portion supported by the diameter enlarged inner diameter portion of the collar.

9. The electric power steering apparatus according to claim 6, wherein the leading end of the leading end shaft of the worm gear is supported by the diameter enlarged inner diameter portion of the collar via a grease.

* * * * *